United States Patent
Kiilerich Pratas et al.

(10) Patent No.: US 12,052,316 B2
(45) Date of Patent: Jul. 30, 2024

(54) EFFICIENT RECEIVING OF SENSOR MEASUREMENTS

(71) Applicant: Nokia Technologies Oy, Espoo (FI)

(72) Inventors: Nuno Manuel Kiilerich Pratas, Aalborg (DK); Daniela Laselva, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/254,392

(22) PCT Filed: Dec. 17, 2020

(86) PCT No.: PCT/EP2020/086780
§ 371 (c)(1),
(2) Date: May 25, 2023

(87) PCT Pub. No.: WO2022/128100
PCT Pub. Date: Jun. 23, 2022

(65) Prior Publication Data
US 2024/0007531 A1   Jan. 4, 2024

(51) Int. Cl.
*H04L 67/12* (2022.01)
*H04L 67/52* (2022.01)
*H04W 24/10* (2009.01)

(52) U.S. Cl.
CPC ............. *H04L 67/12* (2013.01); *H04W 24/10* (2013.01); *H04L 67/52* (2022.05)

(58) Field of Classification Search
CPC ... H04W 4/38; H04W 24/10; H04W 74/0833; H04L 67/52; H04L 5/0057; H04L 5/0073
See application file for complete search history.

(56) References Cited

U.S. PATENT DOCUMENTS 7,176,808 B1 * 2/2007 Broad ................... G01D 21/00
340/870.07
9,755,725 B2   9/2017 Morioka
(Continued)

FOREIGN PATENT DOCUMENTS

EP         2774451 B1    8/2017
JP      2015-133676 A    7/2015
(Continued)

OTHER PUBLICATIONS

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.
(Continued)

*Primary Examiner* — Tonia L Dollinger
*Assistant Examiner* — Linh T. Nguyen
(74) *Attorney, Agent, or Firm* — Robert P. Michal, Esq.; Carter, DeLuca & Farrell LLP

(57) ABSTRACT

Inter-alia, a method is disclosed comprising: receiving measurement indications from a plurality of devices, wherein a respective measurement indication of the measurement indications is indicative of a respective measurement that has been performed by a respective device of the plurality of devices, and wherein the respective measurement indication is received via a pre-configured communication resource that is associated with a measurement value and/or measurement range to which the respective measurement corresponds. It is further disclosed an according apparatus, computer program and system.

1 Claim, 8 Drawing Sheets

(56) References Cited

U.S. PATENT DOCUMENTS

| | | | | |
|---|---|---|---|---|
| 10,951,380 | B1* | 3/2021 | Costa | H04L 5/14 |
| 11,140,656 | B2* | 10/2021 | Åkesson | H04W 4/06 |
| 2014/0105056 | A1* | 4/2014 | Li | H04W 52/0203 |
| | | | | 370/252 |
| 2017/0013424 | A1* | 1/2017 | Saeki | H04W 84/20 |
| 2018/0132273 | A1* | 5/2018 | Zhang | H04L 5/0053 |
| 2018/0132284 | A1* | 5/2018 | Oh | H04W 72/23 |
| 2018/0242058 | A1 | 8/2018 | Hayakawa | |
| 2020/0008247 | A1* | 1/2020 | Kwak | H04B 7/0695 |
| 2020/0028973 | A1 | 1/2020 | Livanos et al. | |
| 2020/0351725 | A1* | 11/2020 | Kim | H04W 36/0069 |
| 2020/0396772 | A1* | 12/2020 | Tirronen | H04W 74/0833 |
| 2021/0099917 | A1* | 4/2021 | Keating | H04W 76/11 |
| 2021/0219163 | A1* | 7/2021 | Sha | H04W 74/0833 |
| 2021/0392702 | A1* | 12/2021 | Han | H04W 74/006 |
| 2022/0030605 | A1* | 1/2022 | Hu | H04L 5/0092 |
| 2022/0124783 | A1* | 4/2022 | Park | H04L 1/1854 |
| 2022/0312536 | A1* | 9/2022 | Xia | H04W 76/20 |
| 2023/0041305 | A1* | 2/2023 | Sharma | H04L 1/0003 |
| 2023/0068789 | A1* | 3/2023 | Christoffersson | |
| | | | | H04W 74/0833 |
| 2023/0269762 | A1* | 8/2023 | He | H04W 56/0015 |
| | | | | 370/329 |
| 2023/0345544 | A1* | 10/2023 | Kim | H04W 74/004 |

FOREIGN PATENT DOCUMENTS

| | | |
|---|---|---|
| JP | 2020-102805 A | 7/2020 |
| WO | 2013/066203 A1 | 5/2013 |
| WO | 2019/162495 A1 | 8/2019 |
| WO | 2020/151668 A1 | 7/2020 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.2.0, Jul. 2020, pp. 1-390.

Dehkordi et al., "A survey on data aggregation techniques in IoT sensor networks", Wireless Networks, vol. 26, 2020, pp. 1243-1263.

International Search Report and Written Opinion received for corresponding Patent Cooperation Treaty Application No. PCT/EP2020/086780, dated Sep. 1, 2021, 13 pages.

Notice of Allowance received for corresponding Patent Application No. 20833830.1, dated Apr. 25, 2024, 7 pages.

* cited by examiner

EFFICIENT RECEIVING OF SENSOR MEASUREMENTS

RELATED APPLICATION

This application was originally filed as PCT Application No. PCT/EP2020/086780 on Dec. 17, 2020, which is incorporated herein by reference in its entirety.

FIELD

The following disclosure relates to the technical field of noise and/or pollution level monitoring, in particular a method, an apparatus and a system are disclosed enabling efficient obtaining of measurements by plurality of devices, in particular sensor devices (or sensors) that are configured to perform measurements.

BACKGROUND

In use cases such as noise and/or pollution level monitoring, the number of deployed devices within the coverage of a cell can reach tenths of thousands.

There are several known drawbacks with regard to the collection of the measurements of a specific physical quantity from a massive number of devices, e.g. low-capability devices. Of course, such measurements may also be performed by User Equipment(s) (UE(s)), increasing the amount of measurements to be handled.

The following procedures are utilized in New Radio (NR) and Narrow-Band-IoT (NB-IoT):

Support of small data transmission in RRC_INACTIVE state has been initiated in 3GPP "NR small data transmissions in INACTIVE state". Solutions for enabling Small Data Transmissions (SDT) in the Uplink in a 5G NR system are therein proposed, which are:
1. 4-step Random Access channel (RACH) based SDT: UP data transmitted in Message (Msg) 3 of a 4-step RACH procedure (e.g. small payload multiplexed with a RRC (Radio Resource Control) Connection Resume Request);
2. 2-step RACH based SDT: UP data transmission happens with MsgA of a 2-step RACH procedure and specifically on the PUSCH resources that are pre-configured by the gNodeB (gNB) and broadcast in System Information with associated physical transmission parameters; and
3. Configured Grant (CG) based SDT: A User Equipment (UE) in RRC_Connected state can receive a CG type1 configuration that indicates the specific pre-configured Physical Uplink Shared Channel (PUSCH) resources to be used for UL data transmission. This CG configuration can also be used when in RRC_Inactive state as long as the timing alignment is valid.

LTE supports already similar solutions to 4-step RACH-based SDT and CG-based SDT for small data transmission. These are known as Early Data Transmission (EDT) and Preconfigured UL Resources (PUR)-based EDT, which are applied to Bandwidth Limited UEs, UEs in Enhanced Coverage and NB-IoT UEs. EDT was first introduced in LTE to further reduce power consumption and latency. It can be applied for both uplink and downlink data transmission (i.e. Mobile Originated (MO)-EDT and Mobile Terminated (MT)-EDT respectively). In LTE, EDT is enabled by using PUR, which does not require performing a Radio Access (RA) procedure.

SUMMARY OF SOME EXEMPLARY EMBODIMENTS

Such SDT procedures and protocols were not designed for use cases where the application is not concerned with the outputs of the individual devices, but is instead interested in the aggregate and/or statistics of the outputs of all the devices in a given area. In current SDT protocols, all exchanges between devices or UEs and the Network: (a) imply that the identity of the device or UE has been first established, and (b) treat the data transmitted by each device individually over dedicated radio and logical resources. In other words, if an IoT application wants to collect the measurements of a large number of devices, then it has to do it in a sequential way to accommodate the very large number of deployed devices.

The introduction of edge, respectively fog computing, allows to localize in the best case communications to the edge of the Radio Access Network (RAN). Yet, the communication overhead is still present as the transmission of each device is still treated individually.

In conclusion, there is currently no mechanism (or other system) that enables (e.g. only) payload to be transmitted without massive signaling overhead being in place to establish the identity of the respective device(s) prior to transmitting such payload. All available mechanisms (e.g. NB-IoT, LTE EDT, and NR SDT) require always the transmission of control/signaling overhead.

It is thus, inter alia, an object to reduce the known drawbacks and in particular enable transmission of the sensor measurements while reducing the transmission of control/signaling overhead, e.g. for NB-IoT, LTE EDT, and/or NR SDT.

According to a first exemplary aspect, a method is disclosed, the method comprising:
receiving measurement indications from a plurality of devices, wherein a respective measurement indication of the measurement indications is indicative of a respective measurement that has been performed by a respective device of the plurality of devices, and wherein the respective measurement indication is received via a pre-configured communication resource that is associated with a measurement value and/or measurement range (or measurement interval) to which the respective measurement corresponds.

This method may for instance be performed and/or controlled by an apparatus, for instance a server (e.g. an IoT application server) or a base station (e.g. a gNB and/or an eNB) of a mobile communication network. Alternatively, this method may be performed and/or controlled by more than one apparatus, for instance a server cloud comprising at least two servers. For instance, the method may be performed and/or controlled by using at least one processor of the server or the base station.

According to a second exemplary aspect, a method is disclosed, the method comprising:
performing a measurement; and
providing a measurement indication via a pre-configured communication resource that is associated with a measurement value and/or measurement range (or measurement interval) to which the respective measurement corresponds.

This method may for instance be performed and/or controlled by an apparatus, for instance a device, such as a mobile terminal, User Equipment (UE), an IoT device, an IIoT (Industrial IoT) device, a low-capability device, a tablet, a laptop, a phone, a wearable, or a combination thereof, to name but a few non-limiting examples. The device may be a device of the mobile communication network. For instance, the method may be performed and/or controlled by using at least one processor of the device.

According to a further exemplary aspect, a computer program is disclosed, the computer program when executed by a processor causing an apparatus, for instance a server, to perform and/or control the actions of the method according to the first and/or second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first and/or second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first and/or second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

According to a further exemplary aspect, a system is disclosed, comprising:
  at least one apparatus according to the first exemplary aspect as disclosed above; and
  a plurality (e.g. at least two) of apparatuses according to the second exemplary aspect as disclosed above.

The least one apparatus according to the first exemplary aspect and the plurality of apparatuses according to the second exemplary aspect may be configured to perform and/or control the method according to the first exemplary aspect and the method according to the second exemplary aspect together, or at least partially jointly.

The system may further comprise:
  at least one Internet-of-Things, IoT, application server that requests the apparatus according to the first exemplary aspect as disclosed above to receive the measurement indications and/or any information derived from these measurement indications, such as a distribution and/or histogram of these measurement indications, and that optionally requests the apparatus according to the first exemplary aspect as disclosed above to provide further details for a specific measurement indication, e.g. including the identification of a respective apparatus according to the second exemplary aspect as disclosed above e.g. that has sent the specific measurement indication.

In the following, exemplary features and exemplary embodiments of all aspects will be described in further detail.

Example embodiments according to all exemplary aspects may allow one or more measurement indications (e.g. measurements of given physical property/properties, e.g. gathered (e.g. measured) by at least one sensor comprised by or connectable to a respective device according to the second exemplary aspect) e.g. of multiple (e.g. a large number of) devices to be transmitted using payload-free transmission and to be collected by a mobile communication network in bulk. This may be accomplished without the mobile communication network being required to, firstly, establishing identities of a respective device (e.g. apparatus according to the second exemplary aspect) of such a plurality of devices nor establishing dedicated resources (requiring signaling to establish the resources) to the respective device(s). After the devices' measurement indications are received (e.g. collected) e.g. at a network entity (e.g. apparatus according to the first exemplary aspect) of the mobile communication network as measurement indications, these may be forwarded, possibly after some further processing (e.g. characterization of the measurement distribution), to an IoT application server e.g. for post processing. An example of a respective measurement indication may be of one or more measurement types, including body and/or surface temperature, humidity, level of chemical compound, to name but a few non-limiting examples.

Example embodiments according to all exemplary aspects may allow that a wireless communication protocol and framework can be much leaner compared to any of the existing solutions to support IoT devices that gather information (e.g. measurements that has been performed by a respective device, e.g. by at least one sensor of the respective device). Payload-free transmission that may make use uniquely of e.g. Level-1 (L1) resources (such as (P)RACH preambles) may be used to convey the measurement indication(s) (e.g. the actual information that would be carried in a conventional payload). As this payload-free transmission has no need for most of the radio protocol layers, all the associated signaling overhead (from MAC/RLC/PDCP) is removed, providing a large saving in radio signaling and, in turn, a large device (e.g. UE) power saving is enabled. Example embodiments according to all exemplary aspects may further enable to reuse existing L1 design without posing additional requirements.

A respective device of the plurality devices may for instance be an apparatus according to the second exemplary aspect. Such a respective device, as described herein, may for instance be portable (e.g. weigh less than 1, 0.9, 0.8, 0.7, 0.6, 0.5, 0.4, 0.3, 0.2, 0.1 kg, or less). Such a respective device may for instance comprise or be connectable to a display for displaying information. Such a respective device may for instance comprise or be connectable to means for outputting sound, e.g. in the form of spoken commands or information. Such a respective device may for instance comprise or be connectable to one or more sensors for determining the devices position and/or gathering information, such as for instance a GNSS receiver, in the form of a GPS receiver, and/or sensors for gathering information indicative of noise and/or pollution and/or location, such as temperature, humidity, CoX, NoX sensors, to name but a few non-limiting examples. Such a respective device may for instance comprise or be connectable to one or more further sensors, e.g. in the form of an accelerometer and/or a gyroscope and/or magnetometer and/or barometer for gathering (e.g. measuring) further information, such as motion sensor data to gather the at least one information. Such a respective device may for instance comprise or be connectable to a receiver and/or a transmitter (e.g. a transceiver) for receiving and/or sending information.

The mobile communication network may for instance be cellular network. The mobile communication network may for example be a mobile phone network like a 2G/3G/4G/5G (e.g. LTE)/New Radio (NR) and/or future cellular communication network. The 2G/3G/4G/5G/NR cellular radio communication standards are developed by the 3GPP and presently available under http://www.3gpp.org/.

According to an exemplary embodiment of the first exemplary aspect, the method further comprises:

requesting measurement indications from the plurality of devices via one or more broadcast messages, wherein a respective broadcast message of the one or more broadcast messages includes an appliance and/or group identifier.

The requesting may be performed and/or controlled by a respective request that is transmitted via the one or more broadcast messages. Such a requesting may initiate the obtaining of the measurement indications. Such a request may be received from an IoT application server by the apparatus according to the first exemplary aspect. In response to such a request, the apparatus according to the first exemplary aspect may trigger or send, thus, request measurement indications from the plurality of devices. In case the apparatus according to the first exemplary aspect is a base station (e.g. a gNB, or an eNB), a respective broadcast message may be sent to the plurality of devices. In case the apparatus according to the first exemplary aspect is another entity of the mobile communication network, e.g. a server, in particular an entity not configured to directly sent information to the plurality of devices, a respective request can be triggered e.g. to be sent to the plurality of devices by the IoT application server. The respective broadcast message with which the requesting is done, may be sent directly to the plurality of devices in case the plurality of devices are located within cell coverage provided by the apparatus according to the first exemplary aspect by the respective broadcast message including an appliance and/or group identifier associated with the plurality of devices. For instance, the one or more broadcast messages may be provided to the plurality of devices that are in e.g. a cell coverage, or to respective device(s) of the plurality of devices meeting a certain condition, such as belonging to a specific service, being in a specific area, being observing a specific RSRP range, or a combination thereof, to name but a few non-limiting examples.

An appliance, as used herein, refers to e.g. certain devices that may be subscribed to a given appliance or a server appliance. Certain devices may be grouped based on their appliance(s).

For instance, an IoT application e.g. executed by the apparatus according to the first exemplary aspect or the IoT application server may request the mobile communication network (e.g. a RAN) to trigger an obtaining of the measurement indications (e.g. collection of configured measurements).

Additionally or alternatively, the requesting may be done periodically by triggering it on part of the apparatus according to the first exemplary aspect. For instance, after lapse of a predefined time interval, a respective requesting may be performed and/or controlled. Thus, the plurality of devices may gather (a) respective measurement(s) also periodically according to a same predefined time interval.

The plurality of devices provide (e.g. send) the measurement indications, e.g. based on above disclosed requesting, to the apparatus according to the first exemplary aspect. Prior to this, the plurality of devices may gather (e.g. measure, e.g. by at least one sensor comprised or connectable to a respective device of the plurality of devices, e.g. configured as apparatuses according to the second exemplary aspect) the measurement(s), e.g. (a) specific value(s) measurable, such as a physical value like a temperature, humidity, or a location estimate, or a combination thereof, to name but a few non-limiting examples. Thus, the actual providing (e.g. reporting) of a respective measurement indication (to the apparatus according to the first exemplary aspect from a respective apparatus according to the second exemplary aspect) may be accomplished by a respective device e.g. selecting at least one pre-configured communication resource. In other words, for instance, if a respective device, e.g. device A, is measuring 10 degrees Celsius as a temperature, then it may select and transmits in the pre-configured communication resource mapped to 10 degrees Celsius a respective measurement indication. While another device, e.g. device B, if it measures the same temperature, may select the same pre-configured communication resource. If a device C measures a different temperature, it may select and transmits a respective measurement indication in the pre-configured communication resource mapped to the measured temperate degrees Celsius.

A respective broadcast message of the one or more broadcast message may be transmitted to the plurality of devices by dedicated signaling (e.g. RRC signaling) which may require that a respective instance of the respective broadcast message is transmitted separately to a respective device of the plurality of devices. For instance, such a dedicated signaling may be used by the plurality of devices that may have low coverage conditions. Such a dedicated signaling may be used with respect to a respective device of the plurality of devices, e.g. in case the respective device may have been added recently to the plurality of devices, or a group of the plurality of devices. Such a dedicated signaling may be used if a respective device of the plurality of devices did not receive a previously transmitted broadcast message.

For instance, in response to a respective broadcast message that is received by a respective device of the plurality of devices, the apparatus according to the first exemplary aspect receives (e.g. obtains) the measurement indications. A respective measurement indication may represent a specific magnitude (e.g. an integer or a decimal value) that may be associated with one or more (e.g. admissible) output values, or quantized measured quantity, e.g. a temperature level measured by a sensor, humidity, pollution, location, or a combination thereof, to name but a few non-limiting examples. Such a quantized measured quantity may fall within an allowed measured quantity range. A respective measurement indication may not comprise the specific magnitude as payload. A respective measurement indication can represent the specific magnitude by the apparatus according to the first exemplary aspect enabling to derive and/or determine the specific magnitude dependent upon via which pre-configured communication resource a respective measurement indication of the measurement indications is received.

According to an exemplary embodiment of the first exemplary aspect, the method further comprises:
  based on the received measurement indications, generating distribution information characterizing a distribution of the measurement values and/or measurement ranges as represented by the received measurement indications.

The distribution information may be generated based on the received measurement indications.

As disclosed above, a respective measurement indication of the measurement indications is received via a pre-configured communication resource. Such a pre-configured communication resource may be defined by a certain time-frequency domain of a transmission opportunity, e.g. a transmission slot and/or sub-channel. Thus, in case a respective measurement indication is received on a certain time-frequency domain, and since this certain time-frequency may be mapped to a defined measurement value or range/interval of measurement values, by receiving the respective measurement indication via the pre-configured communication resource, the apparatus according to the first exemplary aspect is enabled to derive and/or determine the measurement that a respective device of the plurality of devices has measured. Thus, in turn, a respective measurement (e.g. value) is mapped to at least one pre-configured communication resource. Such a pre-configured communication resource may be at least one physical resource. For instance, the at least one physical resource may be a Physical RACH (PRACH) preamble, and/or a RACH opportunity/occasion.

Additionally or alternatively, after the measurement indications are obtained (e.g. received), the apparatus according to the first exemplary aspect may share (e.g. by forwarding) the measurement indications with the IoT application server. The apparatus according to the first exemplary aspect may use existing mobile communication network (e.g. LTE and/or NR) design and/or protocols for this transfer.

The IoT application server may then process the measurement indications and e.g. also generate the distribution information. For instance, whenever the IoT application server may detect that at least one of the measurement value(s) and/or measurement range(s) represented by a respective measurement indication is e.g. above an expected magnitude level/range (e.g. represented by a pre-defined threshold or range), the IoT application server may initiate the sending of the one or more further broadcast messages by the apparatus according to the first exemplary aspect.

Alternatively or additionally, the IoT application server may configure/negotiate with the plurality of devices with a rule or set of thresholds which may trigger (a) respective device(s) of the plurality of devices to initiate a respective device that has provided the respective measurement indication to be provided to the apparatus according to the first exemplary aspect. Based on such a respective device-originated measurement indication, the respective device that measured the specific measurement may be identified. Yet, such a rule (or set of rules) may be more beneficial to events that are previously observed and as such may not allow to account to unforeseen events.

The distribution information characterizing a distribution of the measurement values and/or measurement ranges can be generate since the apparatus according to the first exemplary aspect knows which measurement values and/or measurement ranges are represented by the respective pre-configured communication resource via which a respective measurement indication of the received measurements indications is/was received. The generated distribution information may for instance be in the form of a vector. The distribution information may be forwarded to the IoT application server, which may process the distribution information. Alternatively or additionally, the apparatus according to the first exemplary aspect may process (e.g. analyze the received measurement indications and/or generate and/or analyze the distribution information). Alternatively or additionally, the received measurement indications may be forwarded, e.g. to the IoT application server. The IoT application server may generate the distribution information. Such processing by the apparatus according to the first exemplary aspect and/or by the IoT application server may comprise analyzing whether at least one measurement value and/or measurement range e.g. represented by distribution information lies outside of a threshold or range, or not.

According to an exemplary embodiment of the first exemplary aspect, the method further comprises:
  sending one or more further broadcast message to the plurality of devices, wherein a respective further broadcast message of the one or more further broadcast messages includes an identifier of the used pre-configured communication resource and/or of the measured value and/or measurement range; and
  identifying at least one respective device of the plurality of device that has provided a respective measurement indication of the measurement indications corresponding to a particular measurement value and/or measurement range based on a response to the one or more further broadcast messages.

The one or more further broadcast message may represent a request for receiving a transmission enabling an identification of a respective device of the plurality of devices that may have provided a certain measurement indication. Thus, in response to such a request, a transmission (e.g. a SDT transmission) may be received. The transmission may additionally be forwarded and/or relayed to one or more other entities, e.g. an IoT application server, to name but a few non-limiting examples.

For instance, in case a respective measurement value and/or measurement range lies outside of a threshold or range, it may be of interest which device of the plurality of devices has gathered the respective measurement value and/or measurement range. For this, e.g. one or more further broadcast messages may be sent to the plurality of devices. This sending performed and/or controlled by the apparatus according to the first exemplary aspect may be triggered by itself, and/or by the IoT application server. The one or more further broadcast messages may be sent in the same manner like one or more broadcast messages with which the measurement indications can be requested from the plurality of devices. Via such one or more further broadcast messages, it may be requested from the plurality of devices that reported a/the specific measurement value and/or measurement range in a previous transmission of the measurement indications, to initiate e.g. a transmission so that the respective device(s) can be identified.

The respective device that gathered (e.g. measured) the measurement (e.g. by the apparatus according to the second exemplary aspect) may in response to such one or more further broadcast messages initiate a transmission that it gathered the respective measurement having a defined measurement value and/or measurement range. Such a transmission may enable to identify the respective device of the plurality of devices.

For allowing the respective device that gathered the measurement to determine whether it is requested to identify itself, the one or more further broadcast messages may comprise the defined measurement value and/or measurement range that lies outside the threshold or range, and/or the one or more further broadcast messages may comprise the respective pre-configured communication resource via which the respective device has provided the respective measurement indication representing the defined measurement value and/or measurement range, to name but one non-limiting example. Since the respective device may then transmit information e.g. indicative of that it gathered the respective defined measurement value and/or measurement range, it is enabled to identify the respective device, e.g. by the apparatus according to the first exemplary aspect, or by another entity comprised by the mobile communication network, e.g. the IoT application server. Further, the apparatus according to the first exemplary aspect may provide an identification request to an entity enabled to perform and/or control the identification of the respective device, e.g. based, at least in part, on the transmission.

In case the plurality of devices may have gathered measurements being very similar or equal (e.g. similar or equal physical value, such as same temperature), the respective devices may transmit the respective measurement indication via very similar or via the same pre-configured communication resource. In this case, there can arise a risk of potential collisions. In the following, it is disclosed how to handle such collisions. Further, physical properties of the pre-configured communication resource (e.g. a physical communication resource) are disclosed.

Thus, correspondingly, according to an exemplary embodiment of the second exemplary aspect, the method further comprises:
receiving one or more further broadcast messages including an appliance and/or group identifier and an identifier of the used pre-configured communication resource and/or a measurement value and/or measurement range requesting identification of the apparatus in case the apparatus is associated with the appliance and/or group identifier and has provided a measurement indication being associated with the said measurement value and/or measurement range and/or via the pre-configured communication resource as represented by the identifier.

According to an exemplary embodiment of the second exemplary aspect, a transmission is a Small Data Transmission, SDT.

According to an exemplary embodiment of all exemplary aspects, a respective broadcast message of the one or more broadcast messages and/or a respective further broadcast message of the one or more further broadcast messages is an enhanced paging message, a paging indication in a paging occasion and/or a paging early indication.

The one or more broadcast messages and/or the one or more further broadcast messages may be initiated and/or provided via a same enhanced paging mechanism of the mobile communication network. That is, the apparatus according to the first exemplary aspect may be able to page the plurality of devices (e.g. all devices), e.g. in a given or the targeted group, with a same paging indication and sending one paging message by broadcast, wherein the paging message(s) may contain or comprise a paging indication (e.g. a paging indication of an application ID, rather than a conventional UE ID). Such a paging message may be comprised or represented by the one or more broadcast messages and/or the one or more further broadcast messages. In addition or in the alternative, the paging message may include or comprise the respective measurement value(s) and/or measurement range(s) (e.g. magnitude value(s)) for which the apparatus according to the first exemplary aspect may request the respective device(s) to the abovementioned transmission.

Such paging early indication(s) may be is sent prior to a paging occasion. Such paging early indications may indicate to a device (e.g. of the plurality of devices) or group of devices (e.g. of the plurality of devices) whether to wake up for monitoring for paging at the paging occasion. For instance, this may be done by monitoring PDCCH for paging DCI and/or PDSCH for paging message.

According to an exemplary embodiment of the first exemplary aspect, the method further comprises:
providing a configuration to the plurality of devices, wherein the configuration comprises a set of pre-configured communication resources utilizable by the plurality of devices to provide a respective measurement indication, wherein the pre-configured communication resources of the set of pre-configured communication resources are associated with pre-defined measurement values and/or measurement ranges.

The configuration may be provided to the plurality of devices prior to requesting measurement indications from the plurality of devices. Based on such a requesting, the measurement indications are received by the apparatus according to the first exemplary aspect. The configuration may comprise at least one pre-configured communication resource. Further, the configuration may comprise a mapping and/or an associated of measurement value(s) and/or measurement range(s) to the at least one pre-configured communication resource. In this way, by receiving a respective measurement indication via the at least one pre-configured communication resource, the apparatus is enabled to derive the measurement on the pre-configured communication resource via which a respective device of the plurality of devices has measured.

Further, according to an exemplary embodiment of the second exemplary aspect, the method further comprises:
receiving a configuration, wherein the configuration comprises a set of pre-configured communication resources utilizable by the apparatus to provide the respective measurement indication, wherein the pre-configured communication resources of the set of pre-configured communication resources are associated with pre-defined measurement values and/or measurement ranges.

For instance, the IoT application server may request the mobile communication network (e.g. the apparatus according to the first exemplary aspect representing a base station) to initiate the (e.g. RAN level) configuration or the provision of such a configuration that enables example embodiments according to all exemplary aspects (e.g. the data collection mechanism) to the plurality of devices.

Such a configuration may contain or comprise one or more of the following information about:
i: characteristic(s) of the (e.g. sensor) measurements to be gathered (e.g. value range, quantization step, indication if there is the need to collect/estimate the number of sensors observing a given value or range of values);
ii: indication(s) of which devices (including the creation of group of devices) are to be configured to perform the data collection mechanism (e.g. the identities of the devices or an application ID that when broadcasted, in the RAN, indicates to the devices associated with the application to become configured according with the application ID);

iii: indication(s) on how often and/or when the data collection mechanism is to take place, e.g. for periodic data collection;

iv: indication(s) of triggers that are to be used by the RAN (e.g. mobile communication network) to initiate the data collection mechanism (e.g. if x number of devices associated with the application ask for RAN resources, then this could be indication of an event that requires the measurements of a large number of devices); and v: application level security token(s) that may be used to protect/authenticate the configuration towards the plurality of devices.

Further, the configuration may comprise information about the mapping between measured quantity and a respective pre-configured communication resource(s). The configuration may comprise one or more of the following cases:

i: where each value has a resource assigned;

ii: where a range of values has a resource assigned;

iii: where a range of values has more resources than another range of values; and iv: where some values have multiple resources assigned, while other values are assigned to the same resource.

The mapping and/or association between a measurement value and/or measurement range and the associated pre-configured communication resource(s) of the mobile communication network may be provided to a targeted group of devices of the plurality of devices. The configuration may be a part of a network configuration according to legacy standard. Further, the configuration may be communicated to a targeted group of devices via broadcasted or dedicated signaling.

Finally, the configuration may also comprise or include which SDT resource(s) the plurality of devices (e.g. associated with the application provided by the IoT application server) can use (e.g. to communicate with the apparatus according to the first exemplary aspect or to perform individual device reports).

According to an exemplary embodiment of the first exemplary aspect, the plurality of devices are part of a group, wherein the group is associated with an identifier enabling to address (e.g. via above disclosed paging message) respective devices of the plurality of devices that are part of the group.

This may allow to address a targeted group of the plurality of devices. For instance, the apparatus according to the first exemplary aspect may request measurement indications e.g. for the targeted devices' group to initiate the provision of the measurement indications, e.g. representing the measurement of the respective device. Alternatively or additionally, the apparatus according to the first exemplary aspect may also request the measurement indications based on certain triggers (e.g. periodically or based on the request for pre-configured communication resources from devices associated with the application) e.g. on its own.

The requesting of the measurement indications may be triggered or sent e.g. via a respective enhanced paging mechanism, e.g. wherein the (targeted) group of devices of the plurality of devices, e.g. associated with the IoT application, may be configured to monitor specific paging occasions. Within these paging occasions, the apparatus according to the first exemplary aspect may transmit one paging message which contains/comprises the indication of the application ID (rather than the conventional UE ID) and the first request being made to the device(s) associated with that application.

In one example, a legacy paging mechanism may be used. However a respective (e.g. targeted) group of devices of the plurality of devices may be assigned a device/UE identifier e.g. by an Access and Mobility Management Function (AMF) of the mobile communication network, which may result in the group to share the same paging occasion. In this way, the apparatus according to the first exemplary aspect may be able to page the plurality of devices in a given (e.g. targeted) group with the same paging indication.

According to an exemplary embodiment of the first exemplary aspect, the configuration is provided to the plurality of devices within a cell coverage or to a part of the plurality of devices within the cell coverage by beamforming or by cell sectorization.

The (e.g. network) configuration can be communicated to the plurality of devices within the cell coverage or to a limited area, e.g. by application of Downlink (DL) Transmit (Tx) beamforming or by cell sectorization, to name but a few non-limiting examples.

It will be understood that the apparatus according to the first exemplary aspect may distinguish between different cell areas within its coverage by applying (e.g. Rx) beamforming and/or cell sectorization. For instance, the apparatus according to the first exemplary aspect can utilize this knowledge for creating a relation between the received measurement indications (e.g. collected data) e.g. and the spatial location from where it was received. This relation may be used to allow the IoT application respectively IoT application server to attain a coarse spatial resolution of where a group of sensor measurements are coming from, for instance.

According to an exemplary embodiment of all exemplary aspects, a respective pre-configured communication resource corresponds to a Random Access Channel, RACH, preamble, and/or a RACH opportunity/occasion. Additionally or alternatively, a respective pre-configured communication resource corresponds to a cyclic shift used to transmit a RACH preamble.

A particular RACH preamble may be defined by a particular root sequence index. Additionally or alternatively, a particular RACH preamble may be defined by a particular cyclic shift value (including e.g. '0' value, i.e. no cyclic shift).

Thus, a RACH preamble may correspond to a given root sequence index of a Zadoff-Chu (ZC) sequence of a given length, in combination with a given cyclic shift (including no cyclic shift) to be applied at a transmit side. The applied cyclic shift(s) should be sufficiently spaced from each other so as to retain their orthogonality at a receive side irrespective of the incurred radio propagation delay (e.g. the so-called zeroCorrelationZoneConfig parameter controls the cyclic shift spacing as a function of the expected cell radius). Thus, the zeroCorrelationZoneConfig parameter may be used to select a respective correct number of cyclic shift(s). This may be done through mapping, e.g. zeroCorrelationZoneConfig=0 leads to number of cyclic shift(s)=x, zeroCorrelationZoneConfig=1, leads to number of cyclic shift(s)=y. The actual values may depend on the type of PRACH preamble and/or subcarrier spacing (SCS). A RACH opportunity/occasion may correspond to specific time/frequency radio resources used for detection by the apparatus according to the first exemplary aspect of RACH preamble signals transmitted by the apparatus according to the second exemplary aspect.

As the apparatus according to the first exemplary aspect may not know a-priori which measurement value(s) and/or measurement range(s) will be received, then in general it may not be resource efficient (unless for a reduced number of devices/sensors) to provide a mapping between a specific device of the plurality of devices and a set of resources each corresponding to a set of measurement value(s) and/or measurement range(s). At the same time, since it may be beneficial to extract in an efficient way from a large number of devices (e.g. the plurality of devices) the measurement value(s) and/or measurement range(s) being measured by the devices from a specific quantity, then the identification of respective (e.g. targeted) devices may not be required at this point. A matching between the measurement and the specific device(s) observing (e.g. measuring) can then be accomplished at a later stage (e.g. by utilizing the second request), as disclosed above by the one or more further broadcast messages.

There may be the possibility that multiple (e.g. at least two) devices of the plurality of devices may select the same pre-configured communication resource, which may create a collision at the apparatus according to the first exemplary aspect composed by the multiple transmissions of measurement indications. Depending on the characteristics of the signal being transmitted, the apparatus according to the first exemplary aspect may ensure correct reception. As such, it may be beneficial to use signals for which the detection is robust to the occurrence of collisions. One example of such signals is the Zadoff-Chu sequences as used in the LTE and NR PRACH as RACH preambles received over the same time/frequency resource (e.g. a respective pre-configured communication resource) but with different time shifts, e.g. corresponding to different propagation delays and/or different cyclic shifts applied at the transmit side, can still be robustly detected.

One example implementation may be to assign one or more RACH preambles to a specific measurement value and/or measurement range. In this way, when multiple devices simultaneously transmit their Zadoff-Chu sequence using respective cyclic shifts, different signatures will be obtained (e.g. received) by a network receiver e.g. represented by the apparatus according to the first exemplary aspect. This may assume that (e.g. all) the device(s) of the plurality of devices are synchronized in the downlink with the mobile communication network, but may not require the uplink to be time aligned with the apparatus according to the first exemplary aspect. The RACH (or PRACH) preambles may be detected as activated, if the result of the cyclic cross-correlation between the multiple received RACH preamble signals and a Zadoff-Chu root sequence leads to any of the cyclic shifts associated with the RACH preambles to be above a pre-defined threshold, for instance.

Also, for a sufficient large number of devices of the plurality of devices, it may be possible that the received power at the apparatus according to the first exemplary aspect will be such that Automatic Gain Control (AGC) will no longer be able to compensate for such collisions. As such, it may be beneficial to introduce a compensation factor into an open loop power control taking place at a respective device of the plurality of devices (e.g. apparatus(es) according to the second exemplary aspect) prior to the transmission of the associated RACH preamble. This compensation factor may be applied to (e.g. all) the respective device(s) of the plurality of devices or associated to specific values of the quantity being measured. For instance, if the apparatus according to the first exemplary aspect may expect that a majority of the respective device(s) of the plurality of devices will be measuring 10 to 20 degrees Celsius, then the respective device(s) of the plurality of devices gathering (e.g. observing) those values may apply a certain dB power reduction offset to their preamble transmission.

According to an exemplary embodiment of all exemplary aspects, one or more measurement values and/or measurement ranges are assigned to a pre-configured communication resource of the set of pre-configured communication resources. This may allow to map one measurement value and/or measurement range to many, thus at least two, a plurality of pre-configured communication resources.

Additionally or alternatively, this may allow to map many, thus at least two, measurement values and/or measurement ranges to one pre-configured communication resource.

Thus, some measurement values and/or measurement ranges may be assigned to a first pre-configured communication resource of a set of pre-configured communication resources (e.g. as comprised or represented by the configuration disclosed above), and some other, further measurement values and/or measurement ranges are assigned to a second and a third pre-configured communication resource may be assigned to more than one pre-configured communication resources, e.g. the second and a third pre-configured communication resources.

Additionally, for a case where multiple (e.g. at least two) pre-configured communication resources are mapped to and/or associated with a same value, these pre-configured communication resources may be multiple RACH preambles, e.g. multiple (e.g. at least two) root sequence indexes, or multiple (e.g. at least two) cyclic shifts applied at the transmit side for a same root sequence index, or a combination of both, to name but a few non-limiting examples. Due to multi-path propagation, the use of such multiple RACH preambles may enable a more robust receiving of the measurement indications by the apparatus according to the first exemplary aspect.

It will be understood that other sequences than Zadoff-Chu sequences having similar low-correlation or orthogonal properties may also be applicable, such as m-sequences or gold-sequences.

According to an exemplary embodiment of all exemplary aspects, the further measurement values and/or measurement ranges are measurements with a higher likelihood having a larger number of pre-configured communication resources assigned than measurements with a lower likelihood compared to the ones with the higher likelihood.

It will be understood that measurement values and/or measurement ranges which are expected to be measured more often than other measurement values and/or measurement ranges may be assigned to more of pre-configured communication resources than measurement values and/or measurement ranges which are expected to be measured by the plurality of devices not so often. This may allow to control an occurrence of potential collisions of the measurement indications.

According to an exemplary embodiment of all exemplary aspect, a communication between the apparatus according to the first exemplary aspect and the apparatus according to the second exemplary aspect is protected and/or secured (e.g. via encryption).

For security considerations, example embodiments of all exemplary aspect using broadcasted configuration(s), requesting measurement indications and optionally pooling request(s) to a large number of devices (e.g. the plurality of devices) being part of group, may be subject to abuse. If any of these messages are transmitted plainly (e.g. without being encrypted), then this may open the possibility of abuse. To avoid this, e.g. at the RAN level, such messages respectively transmissions may be protected via encryption e.g. based on application level tokens/security keys, with the assumption that a respective device of the plurality of devices e.g.

associated with the IoT application provided by the IoT application server are able (together with their own security tokens) to decode the messages and/or transmissions. The respective application specific tokens/security keys may be derived/acquired at each device of the plurality of devices based on legacy security procedures, to name but one non-limiting example.

In order to avoid abuse, e.g. the configuration may be protected/encrypted based on RAN level or IoT application level security tokens. This mechanism may be such that the plurality of devices associated with the apparatus according to the first exemplary aspect, and/or an application of the IoT application server, may be able to acquire the configuration.

According to an exemplary embodiment of the second exemplary aspect, the method further comprises:

receiving one or more broadcast messages requesting the measurement indication, wherein a respective broadcast message of the one or more broadcast messages includes an appliance and/or group identifier.

As disclosed above, the apparatus according to the second exemplary aspect may receive the first request e.g. sent by the apparatus according to the first exemplary aspect. As disclosed above, the one or more broadcast messages with which the apparatus according to the first exemplary aspect triggers or initiates the performing of the measurement on part of the apparatus according to the second exemplary aspect. Thus, in response to such a requesting, e.g. by at least one sensor comprised by or connectable to the apparatus according to the second exemplary aspect, the measurement is performed. The apparatus according to the second exemplary aspect may generate the measurement indication and then e.g. provide (e.g. transmit or send) the measurement indication to the apparatus according to the first exemplary aspect via a pre-configured communication resource. Thus, such features disclosed above with regard to the first exemplary aspect equally apply to the second exemplary aspect.

The apparatus according to the second exemplary aspect e.g. in a targeted group may activate and use for transmission of the measurement indication one (or several) of the pre-configured communication resource(s), e.g. time/frequency resources associated with the (e.g. currently) measurement performed by the apparatus according to the second exemplary aspect. It is noted that the existing physical design of NR may be reused largely/completely for this transmission of the observation vector.

The apparatus according to the first exemplary aspect may observe which of the pre-configured communication resources have been used (corresponding to the measurement of the apparatus according to the second exemplary aspect). Based on these, the apparatus according to the first exemplary aspect may be enabled to extract the currently observed measurement values and/or measurement ranges, e.g. in the group of targeted devices. In other words, the apparatus according to the second exemplary aspect may extract/create a summary, characterized e.g. by the number of observations reported for each magnitude level or for a respective range/interval of magnitude levels, e.g. the distribution information.

The features and example embodiments described above may equally pertain to the different aspects.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
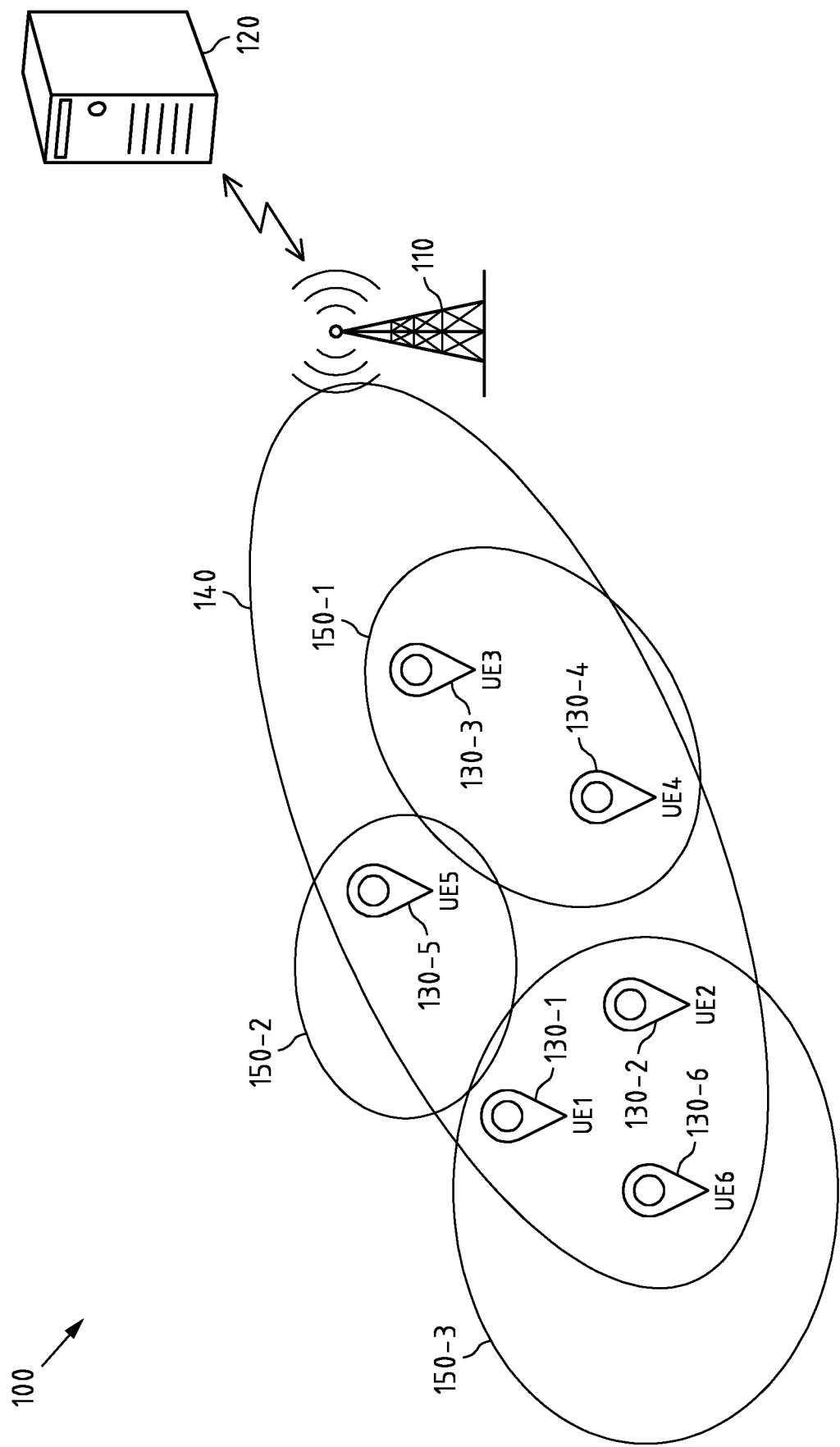
FIG. 1 a schematic block diagram of a system according to an exemplary aspect.

FIG. 1 is a schematic high-level block diagram of a system 100 that may be utilized by example embodiments according to all exemplary aspects.

System 100 comprises a base station 110 (e.g. a gNB or an eNB) and a plurality of devices 130-1 to 130-6 that are located within cell coverage 140 of the base station 110. Base station 110 may for instance be an apparatus according to the first exemplary aspect. A respective device 130-1 to 130-6 may for instance be an apparatus according to the second exemplary aspect. Further, system 100 comprises a server, e.g. an IoT application server 120. At present, devices 130-1, 130-2 and 130-6 are part of a (e.g. targeted) group 150-3, devices 130-3 and 103-4 are part of another (e.g. targeted) group 150-1, and the device 130-5 is part of a third (e.g. targeted) group 150-2. The respective devices comprised by the respective groups 150-1 to 150-3 may be paged, e.g. by a single paging message that may be broadcasted to the respective group 150-1 to 150-3. Then, the respective device(s) belonging to a particular group 150-1, 150-2 or 150-3 perform a measurement, and provide it as a respective measurement indication to the base station 110. The base station 110 may generate distribution information based, at least in part, on the received measurement indications. A respective distribution information may be generated based, at least in part, on the received measurement indications of the respective devices of a certain group of the groups 150-1, 150-2 or 150-3.

Example embodiments enable that a configuration is provided to the devices 130-1 to 130-6 by the base station 110. The configuration comprises a set of pre-configured communication resource usable by the devices 130-1 to 130-6 to provide a respective measurement indication. Further, the configuration comprises an association between a pre-configured communication resource and a measurement value and/or a measurement range/interval (e.g. specific (e.g. physical) values) to be gathered (e.g. measured) by the devices 130-1 to 130-6). As disclosed above, one or more groups 150-1 to 150-3 may be triggered to provide such measurement indications, e.g. gathered by sensor(s) comprised by or connectable to the devices 130-1 to 130-6 b. Instead of explicitly transmitting the measurements e.g. as payload in a dedicated signaling message to the base station 110, the devices 130-1 to 130-6 provide respective measurements indication(s) via a pre-configured communication resource (e.g. time and/or frequency domain resources) to the base station 110. Since e.g. in the configuration, e.g. a mapping is comprised which pre-configured communication resource(s) correspond to a specific measurement, the base station 110 when obtaining (e.g. receiving) the respective measurements indication(s) can derive and/or determine the measured values and accumulate them for generating distribution information.

The base station 110 may then forward the distribution information to the IoT application server 120.

To identify a certain device of the devices 130-1 to 130-6 that has gathered a specific measurement, e.g. a request may be sent by a one or more further broadcast messages to the devices 130-1 to 130-6. The request may be indicative of a specific measurement value and/or a measurement range and/or of a specific pre-configured communication resource via which the base station 110 has received a respective measurement indication. This may allow to identify the respective device(s). Of course, an identifier of the respective device(s) or of a group of the devices to which the device(s) that the specific measurement value and/or a measurement range has measured belongs, may also be utilized.

Figure 2:
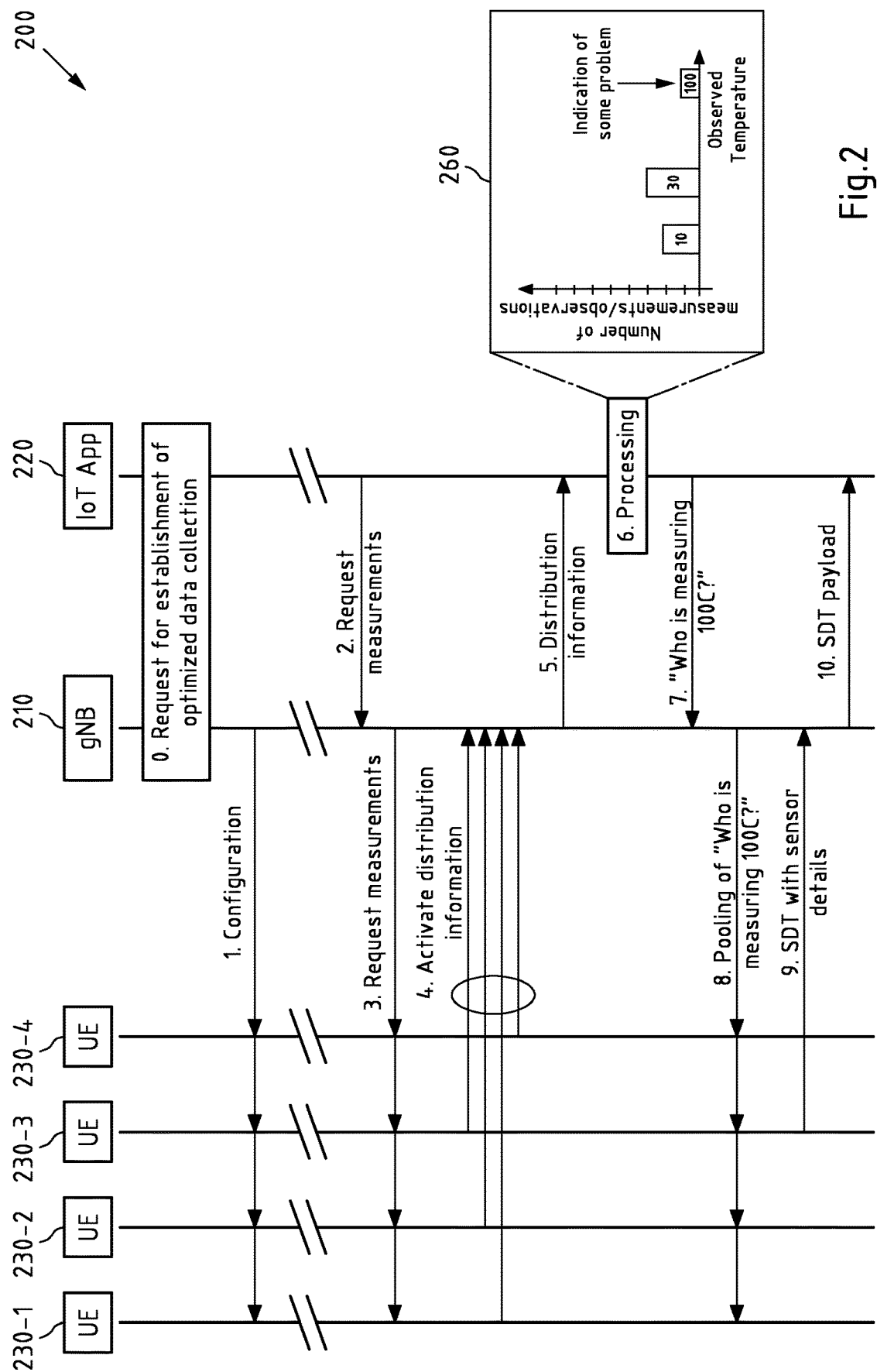
FIG. 2 a flowchart showing an example embodiment of a system according to an exemplary aspect.

In FIG. 2, a flowchart an example embodiment of a system 200 according to an exemplary aspect is shown. The system 200 may utilize an access protocol and its technical merits enabled. In the example embodiment of FIG. 2, it is shown how the example embodiment according to all exemplary aspects can be used to efficiently support e.g. an IoT application for gathering information, here measuring of temperature value(s). The steps as shown in the flowchart are as follows:

Step 0:

The IoT application 220, e.g. provided by an IoT application server, requests a RAN (e.g. mobile communication network) to initiate the RAN level configuration that enables the collection mechanism. Based on such a request, the RAN, or an entity such as a base station (gNB 210) of the RAN may determine a configuration to be provided to the device (UEs 230-1 to 230-4).

a: Such a request may contain information about:
   i: one or more characteristics of the measurements to be performed (e.g. sensor measurements, e.g. to be collected, e.g. value range, quantization step, indication if there is the need to collect/estimate the number of sensors observing a given value or range of values);
   ii: at least one indication of which device(s) (including the creation of group of devices) may be configured to perform the data collection mechanism enabled by example embodiments according to all exemplary aspects (e.g. the identities of the devices or an application ID that when broadcasted, in the RAN, indicates to the devices associated with the application to become configured according with the application ID);
   iii: at least one indication on how often and/or when such a data collection mechanism may take place, e.g. enabling periodic data collection;
   iv: at least one indication of triggers/events that should be used by the RAN to trigger (e.g. initiate) such a data collection (e.g. performing a respective measurement, e.g. if a certain number of devices associated with the IoT application ask for RAN resource(s), then this may be an indication of a trigger/an event that may require the information of a large number of devices to be gathered); and
   v: one or more application level security token that may be used to protect/authenticate the configuration towards the devices.

Step 1:

The configuration is provided to the plurality of devices 230-1 to 230-4. For instance, based on the IoT application request of Step 0, the RAN (e.g. the gNB 210) may initiate the configuration enabling the data collection mechanism. The configuration may have a specific magnitude (e.g. an integer or a decimal value to be represented by a measurement value and/or measurement range) associated with one or more or each admissible output values (or quantized measured quantity, e.g. a temperature level measured by a sensor) falling within an allowed measured quantity range/interval to be gathered by the devices 230-1 to 230-4. In turn, such a magnitude may be associated with and/or mapped to at least one pre-configured communication (e.g. physical) resource (e.g. a Physical RACH (PRACH) preamble).

a: Such a mapping between the measurement to be performed (e.g. measured quantity values) and the pre-configured communication resource(s) may be comprised or represented by the configuration. Such a mapping may be based, at least in part, on one or more of the following cases:
   i: where a respective measurement value of admissible values may have a (e.g. pre-configured communication) resource assigned;
   ii: where a respective measurement range/interval of values of admissible values may have a (e.g. pre-configured) resource assigned;
   iii: where a measurement range of values of admissible values may have more (e.g. pre-configured communication) resources than another range of values of the admissible values; and
   iv: where some measurement values of admissible values may have multiple (e.g. pre-configured communication) resources assigned, while other values of the admissible values may be assigned to a/the same (e.g. pre-configured) resource.

b: Such a mapping between a magnitude value and the associated (e.g. network and/or pre-configured) resource(s) may be provided to the targeted group of devices as part of a network configuration (e.g. by providing the configuration, as disclosed in step 1), and may be communicated to the intended group of devices via broadcast or, alternatively or additionally, via dedicated signaling (e.g. RRC signaling).

c: Such a configuration may be communicated to (e.g. all) the plurality of devices 230-1 to 230-4 within a cell coverage of the gNB 210, and/or to an area limited by the application 220 e.g. by means of (e.g. Tx) beamforming, to name but one non-limiting example.

d: In order to avoid abuse, the configuration may be protected/encrypted based on RAN level or IoT application 220 level security tokens. This mechanism may be such that the devices 230-1 to 230-4 of a plurality of devices e.g. within cell coverage of the gNB 210 associated with the application may be able to acquire (e.g. receive) the configuration.

e: Finally, the configuration may include or comprise which SDT resources the devices 230-1 to 230-4 associated with application 220 may use (e.g. to communicate with the IoT application server or to perform individual device reports, e.g. based on a received second request).

Step 2:

The IoT application 220 may request the RAN to trigger the collection of the (e.g. configured by the provision of the configuration) measurements, by one or more broadcast messages.

Step 3:

The network respectively the gNB 210 triggers the sending of the one or more broadcast messages for the targeted devices' 230-1 to 230-4 group e.g. to transmit the output of their measurement(s) as respective measurement indications. Additionally or alternatively, the network respectively the gNB 210 may also initiate the requesting based on certain triggers (e.g. periodically or based on the request for resources from devices associated with the application). Still additionally or alternatively, the trigger condition may be part of the configuration of the devices 230-1 to 230-4 performed in step 1. For instance, the RAN may configure the devices 230-1 to 230-4 with an indication as to how often and/or when the collection of measurements may take place, e.g. enabling periodic measurements collection.

Then the network respectively the gNB 210 sends the one or more broadcast messages to the devices 230-1 to 230-4.

a: The one or more broadcast messages may be initiated via an enhanced paging mechanism. For instance, the respective group of devices (e.g. UEs 230-1 to 230-4) associated with the application 220 may be configured to monitor specific paging occasions. Within these paging occasions, the network respectively the gNB 210 may transmit one paging message, which may contain the indication of the application ID (rather than the conventional UE ID). The one or more broadcast messages may be made to the devices (e.g. UEs 230-1 to 230-4) associated with that application 220.

i: In one further example embodiment, legacy paging mechanism may be used. However a respective group of devices (e.g. UEs 230-1 to 230-4) may be assigned a respective device/UE identifier e.g. by the AMF, which may result in the respective group to share the same paging occasion. In this way, the network respectively the gNB 210 may be able to page the devices (e.g. UEs 230-1 to 230-4) in a given group with the same paging indication.

Step 4:

Activation/generating of measurement indications by a respective device of the plurality of devices 230-1 to 230-3 takes place. A respective device in a target group may provide a measurement indication to the gNB 210 via a respective pre-configured communication resource matching to a performed measurement (e.g. temperature value of a respective measurement done by a respective device prior to the generating of the respective measurement indication). Thus, a respective device of the devices 230-1 to 230-4 may perform and/or control one or more of the following:

a: A respective device in the indicated group activates and uses for transmission one (or several) of the pre-configured communication resource(s) (e.g. time/frequency resources) associated with the currently gathered/measured/observed magnitude of the measurement and/or information (e.g. physical quantity) e.g. being currently measured by the respective device.

i: It is noted that the existing physical design of NR may be reused (e.g. completely) for the providing of the respective measurement indication, thus, for this transmission.

b: The network respectively gNB 210 receives the measurement indications, and optionally may observe which (e.g. pre-configured communication) resources have been used (corresponding to the observed magnitudes). Based on these, the network respectively gNB 210 is able to extract the currently observed measurement value(s) and/or measurement range(s) e.g. gathered by the group of devices. In other words, the network respectively gNB 210 may extract/create/generate the distribution information, characterized e.g. by the number of observations/measurements reported for the defined magnitude levels and/or magnitude ranges.

i: It is noted that the network respectively gNB 210 may distinguish between different cell areas within its cell coverage (e.g. see cell coverage 140 and the groups 150-1 to 150-3 of FIG. 1) e.g. by applying (e.g. Rx) beamforming and/or cell sectorization: the network respectively gNB 210 may utilize this knowledge for creating a relation between the collected data and the spatial location from where it was collected, to name but a few but non-limiting example. The relation may be used to allow the IoT application 220 to attain a coarse spatial resolution of where a group of sensor measurements are coming from.

Step 5:

The network respectively gNB 210 may share the distribution of the received measurement indications, for instance as an observation vector or alike, with the IoT application 220 e.g. provided by the IoT application server.

a: the network can use existing NR design and protocols for this transfer of the measurement indications.

Alternatively, the network respectively gNB 210 may simply forward the measurement indications to the IoT application 220 e.g. provided by the IoT application server for further characterization.

Step 6:

The IoT application and/or the gNB 210 server may process the observation vector and, whenever it detects that at least one of the observed values represented by the measurement indications is above an expected magnitude level/range, it may initiate one or more of the following steps 7 to 10, disclosed below:

Step 7:

The IoT application server may request the network respectively gNB 210 to identify which device(s) of the devices 230-1 to 230-4 have observed a specific magnitude value (or range of values) of the measured physical quantity.

a: It is noted that alternatively, an IoT application server or the network respectively gNB 210 may configure/negotiate (e.g. by the provided configuration) its devices with a rule or set of thresholds which can trigger the affected devices to initiate a device-originated report. Yet, this rule (or set of rules) may not always be limited to events previously observed and as such may not allow the identifying of a respective device e.g. in case of unforeseen events.

Step 8:

The network respectively gNB 210 may send one or more further broadcast messages to the devices 230-1 to 230-4 e.g. in the targeted group, indicating a specific magnitude value (or range of values) and/or a certain pre-configured communication resource. This may allow to request the device(s) that reported that magnitude in a previous transmission, to initiate another (e.g. second) transmission, e.g. a SDT transmission.

a: This network transmission may be initiated via the same enhanced paging mechanism described in step 3.a above.

i: That is, the network respectively gNB 210 is able to page (e.g. all) the devices in a given group with the same paging indication and sending one paging message, which may contain or comprise the indication of the application ID (rather than the conventional UE IS).

ii: In addition, the paging message may comprise or include the magnitude value(s) or range(s), or an identifier of the pre-configured communication resource(s) corresponding to this magnitude value(s) or range(s) for which it requests the devices 230-1 to 230-4 to initiate such a second transmission.

Step 9:

The device(s) 230-1 to 230-4 meeting the indicated magnitude value(s) or range(s), or which have used the indicated pre-configured communication resource(s), may proceed with enabling them to be identified (e.g. using one of the SDT procedures, according to the configuration provided in the message of step 1 of FIG. 2), in order to enable reporting the respective device's identity, to name but one non-limiting example.

Step 10:

The network respectively gNB 210 may receive the respective transmission(s), and may identify the corresponding device(s) of the devices 230-1 to 230-4, and may also forward such collected SDT payloads received by the second transmission to the IoT application 220 provided by the IoT application server.

FIG. 3a to FIG. 3e show an implementation example according to an exemplary aspect.

Two example embodiments according to all exemplary aspects are disclosed, which are realized using PRACH preambles for the transmission of the observed magnitude. It is shown how the method according to the first and/or second exemplary aspect can be used in the existing physical design of NR. It is noted that other types of sequences (e.g. Group-Wake-Up, GTS, sequences specified for NB-IoT in LTE) or type of resources may be used to accomplish the same effect.

In the first example shown in FIG. 3a to FIG. 3e, an implementation of the access procedure is disclosed in which the IoT application (e.g. 220 of FIG. 2) (e.g. via distribution information) is able to determine which magnitude of values are being measured, but not how many devices are measuring them. In a second example shown in FIG. 4a to FIG. 4e, another implementation example is disclosed where the IoT application (e.g. 220 of FIG. 2) gets both the information of which magnitude values are being measured as well as how (or at least an estimation of how) many devices (e.g. 230-1 to 230-4 of FIG. 2) are measuring them.

Figure 3:
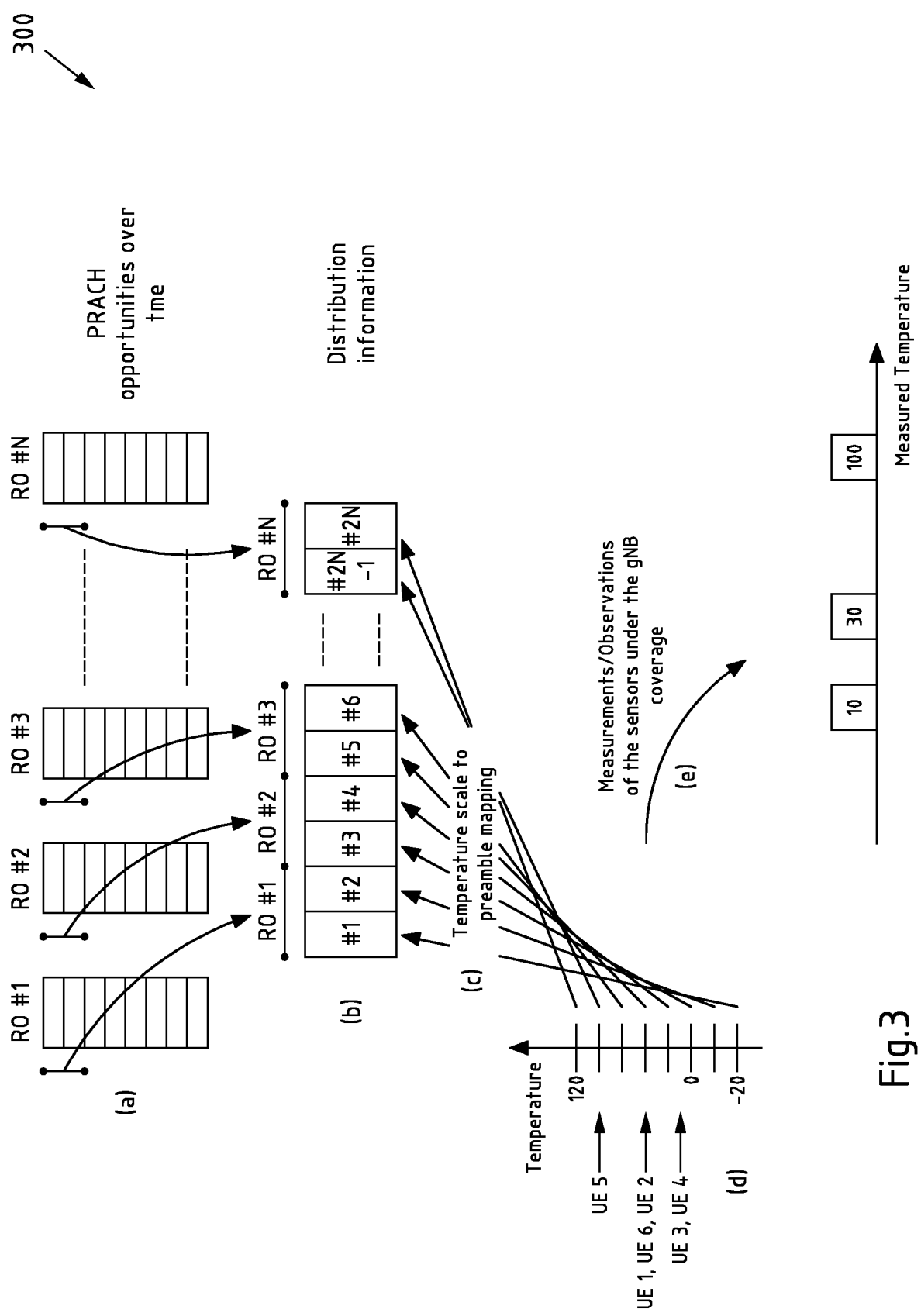
FIGS. 3a-e an implementation example according to an exemplary aspect.

In FIG. 3a and FIG. 4a, a shown column corresponds to a Random Access Opportunity. Within a respective Random Access Opportunity, a respective (e.g. each) block corresponds to a PRACH preamble. A respective (e.g. each) Random Access Opportunity occurs in its own time and frequency, while the PRACH preambles correspond to an interval of cyclic shifts associated with a respective Zadoff-Chu root sequence. Since multiple Random Access Opportunities can occur at the same time, along a respective x-axis (not explicitly shown in FIG. 3a and FIG. 4a), the different Random Access Opportunities are illustrated. Along a respective y-axis (not explicitly shown in FIG. 3a and FIG. 4a) of FIG. 3a and FIG. 4a, different preambles or intervals of cyclic shifts are illustrated.

In FIG. 3b and FIG. 4b, a combining of the multiple PRACH preambles in the different Random Access Opportunities into a respective distribution information is illustrated.

In the following, the respective steps of the first example: Observed magnitudes are disclosed:

Step 1:

The network respectively a base station of a respective mobile communication network (e.g. gNB 210 of FIG. 2) configures a set of preambles and multiple PRACH opportunities/occasions (see FIG. 3a, e.g. via the configuration provided). The multiple Random Access Opportunities are shown as RO #1 to RO #N;

a. These preambles (RO #1 to RO #N) are combined into or based on them a respective distribution information is created/generated (see FIG. 3b).

b. A respective (e.g. each) preamble in this distribution information is mapped to a physical quantity within a given scale (see FIG. 3c and FIG. 3d). It is noted that in the provided example, the physical quantity being measured is temperature. The respective mapping is illustrated by the arrows of FIG. 3c pointing to the blocks of FIG. 3b and between FIG. 3b and FIG. 3d. This is shown as the temperature scale to preamble mapping in FIG. 3c c. If a given preamble in the distribution information is deemed as active, then the IoT application (e.g. via the gNB 210 of FIG. 2) may perceive that there is at least one sensor measuring that physical quantity value.

2. Then, the devices (e.g. devices 230-1 to 230-4 of FIG. 2) under the gNB 210 of FIG. 2 coverage are informed (either via dedicated signaling or via a SIB dedicated to these type of IoT applications);

a. The configuration may comprise or include at least:

i. the location of the PRACH opportunities;

ii. which preambles are used for this scheme;

iii. what is the mapping between the physical quantity scale and the measurement indication (it is noted that e.g. assistance information may have been received from an IoT application server providing an IoT application (e.g. 220 of FIG. 2) for assigning this mapping); and iv. how often and/or when should these measurements be triggered (periodic report vs on demand).

Step 3:

Upon being requested to report the current measured physical quantity, a respective device (e.g. UE respectively device, e.g. the devices 230-1 to 230-4 of FIG. 2) activates the respective preamble in the respective PRACH opportunity (see FIG. 3e). Thus, a respective distribution information may be provided via the pre-configured communication resource to the respective devices 230-1 to 230-4 of FIG. 2.

Step 4:

The IoT application (e.g. 220 of FIG. 2) then receives the results from the distribution information (via the gNB), and/or receives the measurement indications. The latter may enable the IoT application (e.g. 220 of FIG. 2) to determine the distribution information by itself. The arrow pointing from FIG. 3d to FIG. 3e illustrates the observation of the sensors under the gNB coverage as derivable based on the distribution information. The respective observed temperature, but not the number of observations, can be derived from the measurement indications. In FIG. 3e, the result is illustrated in a diagram: a respective low temperature (10 degrees Celsius) was observed and provided as a respective measurement indication, a respective higher temperature (30 degree Celsius) was observed and provided as a respective measurement indication. Further, a very high temperature (100 degree Celsius) was observed and provided as a respective measurement indication. In contrast to FIG. 4e, in FIG. 3e the x-axis is not shown since the number of observations cannot be determined according to this first example.

FIG. 4a to FIG. 4e shows another implementation example according to an exemplary aspect. In this implementation example, observed magnitudes (e.g. measurements by the respective device(s)) and number of devices observing it is derivable based on the measurement indications received by a base station of a mobile communication network (e.g. gNB 210 of FIG. 2).

Step 1:

The network respectively a base station of a respective mobile communication network (e.g. gNB 210 of FIG. 2) configures a set of preambles distributed across multiple PRACH opportunities. The multiple Random Access Opportunities are shown as RO #1 to RO #N (see FIG. 4a).
  a. These preambles (RO #1 to RO #N) are combined into or based on them a distribution information is generated (see FIG. 4b).
  b. A set of multiple preambles in this distribution information is mapped to a physical quantity within a given scale, wherein the mapping is illustrated by the arrows of FIG. 4c pointing to the blocks of FIG. 4b and between FIG. 4b and FIG. 4d. This is shown as the temperature scale to preamble mapping in FIG. 4c.
    i. In the provided example, the physical quantity being measured as the measurement and is a temperature.
    ii. The preambles within the set can be used to create an estimator of the number of sensors by the respective device(s) observations of the same physical quantity range.
  c. If a given preamble within a set in the measurement indication is deemed as active, then the IoT application (e.g. 220 of FIG. 2) (e.g. via the gNB 210 of FIG. 2) will perceive that there is at least one device/sensor (e.g. of the devices 230-1 to 230-4 of FIG. 2) gathering (e.g. measuring) that physical quantity value as respective at least one information.

Step 2: Then, the devices (e.g. devices 230-1 to 230-4 of FIG. 2) under the gNB (e.g. gNB 210 of FIG. 2) cell coverage are informed (either via dedicated signaling or via a SIB dedicated to these types of IoT applications, to name but a few non-limiting examples).
  a. The configuration may comprise or include at least:
    i. the location of the PRACH opportunities;
    ii. which preambles are used for this scheme;
    iii. what is the mapping between the physical quantity scale and the pre-configured communication resource(s) to be used to provide a respective measurement indication; and
    iv. how often and/or when should these measurements be triggered (periodic report vs on demand);

Step 3:

Upon being requested to report the current measured physical quantity, a respective device (e.g. of the devices 230-1 to 230-4 of FIG. 2) activates the respective preamble in the respective PRACH opportunity (see mapping in FIG. 4c). The selection of the preamble within the assigned RACH opportunity can be done uniformly random or it can be based on the weight assigned to each preamble.

Step 4:

The IoT application (e.g. 220 of FIG. 2) then receives e.g. via the gNB (e.g. gNB 210 of FIG. 2) the results from the distribution information (via the gNB) and/or receives the measurement indications. The latter may enable the IoT application (e.g. 220 of FIG. 2) to determine the distribution information by itself. The arrow pointing from FIG. 4d to FIG. 4e illustrates the observation of the sensors under the gNB coverage as derivable based on the distribution information. The number of observations and the respective observed temperatures can be derived from the measurement indications. In FIG. 4e, the result is illustrated in a diagram: twice, a respective low temperature (10 degrees Celsius) was observed and provided as a respective measurement indication, 3 times a respective higher temperature (30 degree Celsius) was observed and provided as a respective measurement indication. Further, e.g. an outlier of a very high temperature (100 degree Celsius) was observed and provided as a respective measurement indication. In contrast to FIG. 3e, in FIG. 4e the x-axis shows the number of observations which can be determined according to this second example.

In this implementation example, the distribution information comprises or contains multiple entries/preambles that are associated with the same measurement by the plurality of devices (e.g. devices 230-1 to 230-4 of FIG. 2). The network node respectively base station of the mobile communication network (e.g. the gNB 210 of FIG. 2) or the IoT application (e.g. 220 of FIG. 2) can estimate the number of devices observing a specific value based on the number of activated preambles as well as the specifically activated preambles.

In one further (e.g. estimator) implementation example, there may be a mapping between the number of activated preambles and the range of total devices activating these preambles within an interval of confidence. E.g. if x preambles out of y total preambles are activated then the range of devices observing this value (by performing a respective measurement) is within $z\pm\theta$ with 95% of confidence, e.g. a respective estimation of the confidence level can be achieved.

In another (e.g. estimator) implementation example, each preamble within the set of preambles is assigned a selection probability/weight. Each device selects a preamble based on these weights. Meaning that some preambles will be more likely selected than others. Then these weights are used as input in the estimator and allow a more accurate detection of the number of devices.

A respective estimator can be implemented based on a maximum likelihood estimator construction or be emulated via machine learning architecture such as a neural network (although this later approach requires training data to obtain a robust estimator).

Figure 5:
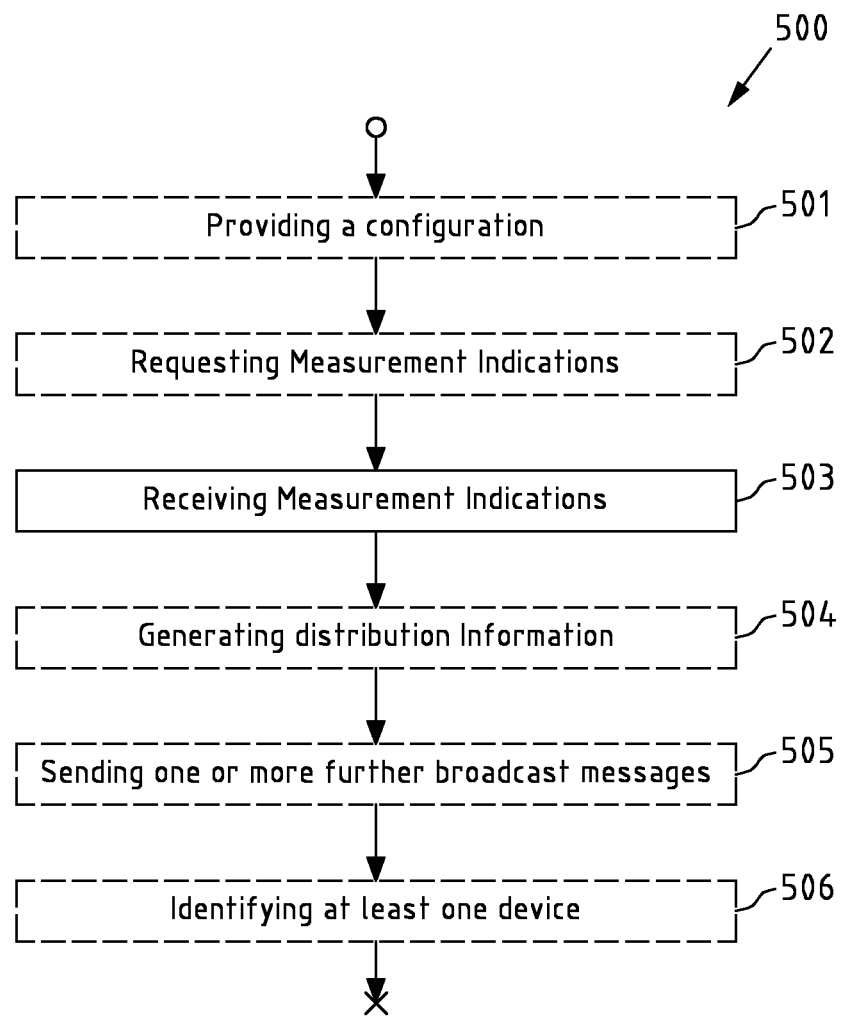
FIG. 5 a flowchart showing an example embodiment of a method according to the first exemplary aspect.

FIG. 5 is a flowchart 500 showing an example embodiment of a method according to the first exemplary aspect. This flowchart 200 may for instance be performed by the base station 110 of FIG. 1 or 210 of FIG. 2.

In an optional first step 501, a configuration is provided, e.g. by sending the configuration to plurality of devices, e.g. the devices 130-1 to 130-6 of FIG. 1 or the devices 230-1 to 230-4 of FIG. 2. The configuration may be provided via broadcast, groupcast, or unicast, or via dedicated signaling.

In an optional second step 502, measurement indications are requested, e.g. by sending one or more broadcast messages to the plurality of devices, e.g. the devices 130-1 to 130-6 of FIG. 1 or the devices 230-1 to 230-4 of FIG. 2. The one or more broadcast messages may be triggered to be send by an IoT application server, e.g. IoT application server 120 of FIG. 1 or 220 of FIG. 2. Further, the sending of the one or more broadcast messages may be triggered to be provided (e.g. sent) to the plurality of devices periodically. A (e.g. single) broadcast message may also be sent to the plurality of devices. The one or more broadcast messages may be sent to plurality of devices being a part of a group, e.g. one or more of the groups 150-1 to 150-3 of FIG. 1.

In a third step 503, measurement indications are received or obtained via at least one pre-configured communication resource from the plurality of devices. Based on the one or more broadcast messages, the plurality of devices may perform a respective measurement (e.g. see step 603 of FIG. 6), and provide the measurement indication via a respective pre-configured communication resource that is mapped to and/or associated with the measurement value and/or measurement range (see step 604 of FIG. 6) to the apparatus performing and/or controlling the flowchart 500.

In an optional fourth step 504, distribution information are generated based, at least in part, on the measurement indications received in step 503.

The received measurement indications, or distribution information derived from the received measurement indications may be forwarded to an IoT application server, e.g. IoT application server 120 of FIG. 1, or 220 of FIG. 2.

In a fifth step 505, one or more further broadcast messages are sent or triggered to be sent, e.g. in response to a respective measurement indication of the received measurement indications of step 503 lying outside of a pre-defined threshold value or range. For instance, a respective device may be requested to be identified that measured a specific/faulty value(s) or range(s). This is enabled by sending the one or more further broadcast messages to the respective plurality of devices, or devices that are part of a group (e.g. group 150-1, 150-2 or 150-3 of FIG. 1), wherein the one or more further broadcast messages may comprise the measured and specific/faulty value(s) or range(s), or the pre-configured communication resource(s) associated therewith. Then, e.g. via a SDT, the respective device that measured the specific/faulty value(s) or range(s) may transmit information (see step 606 of FIG. 6), enabling it to be identified.

In an optional sixth step 506, the at least one device respectively the device that measured the specific/faulty value(s) or range(s) is identified.

Figure 6:
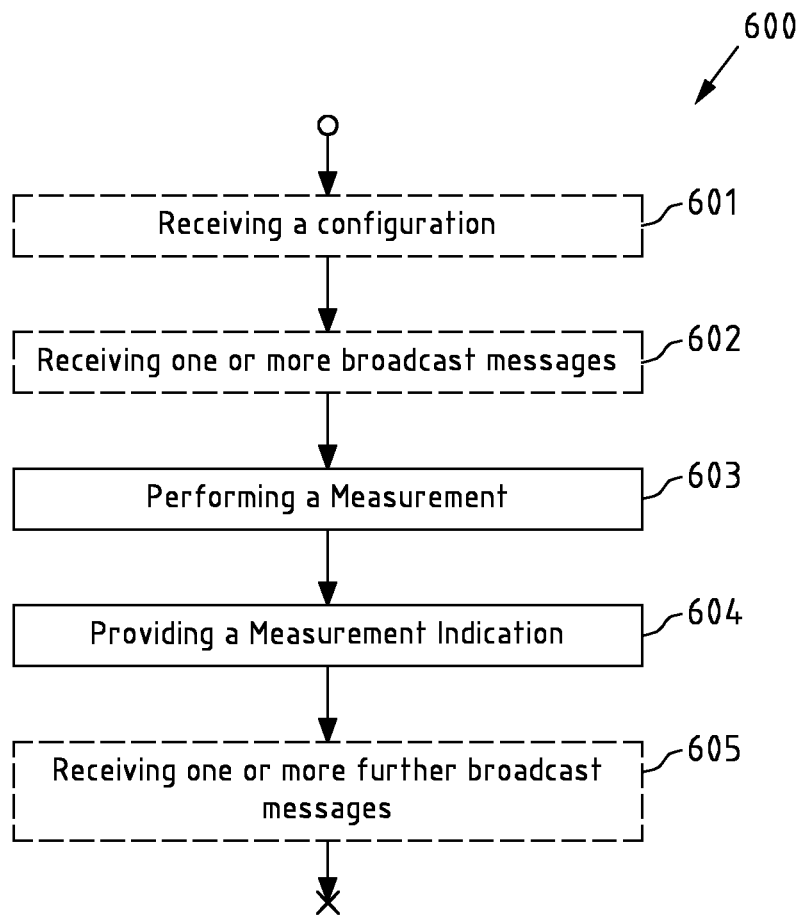
FIG. 6 a flowchart showing an example embodiment of a method according to the second exemplary aspect.

FIG. 6 is a flowchart 600 showing an example embodiment of a method according to the first exemplary aspect. This flowchart 600 may for instance be performed by one of the devices 130-1 to 130-6 of FIG. 1, or 230-1 to 230-4 of FIG. 2.

In an optional first step 601, a configuration, e.g. as provided in step 501 of FIG. 5, is received.

In an optional second step 602, one or more broadcast messages are received. The one or more broadcast messages may be triggered or sent by the apparatus performing and/or controlling the flowchart 500 of FIG. 5. The one or more broadcast messages may request measurement indications to be provided.

In a third step 603, e.g. in response to the one or more broadcast messages of step 602, a measurement is performed, e.g. by measuring a given physical quantity or by gathering some information, e.g. by at least one sensor comprised by or connectable to the apparatus performing and/or controlling the flowchart 600.

In a fourth step 604, based on the measurement, a measurement indication is provided, e.g. to the apparatus performing and/or controlling the flowchart 500 of FIG. 5. The measurement indication is provided via pre-configured communication resources (e.g. in a time and/or frequency domain) corresponding to a specific value that is measured in step 603.

Then, in an optional fifth step 605, one or more further broadcast messages are received, e.g. comprising a certain or specific/faulty measurement value(s) and/or measurement range(s), or the pre-configured communication resource(s) associated therewith, and optionally in response, the apparatus performing and/or controlling the flowchart 600 in case it has measured the certain or specific/faulty measurement value(s) and/or measurement range(s).

Figure 7:
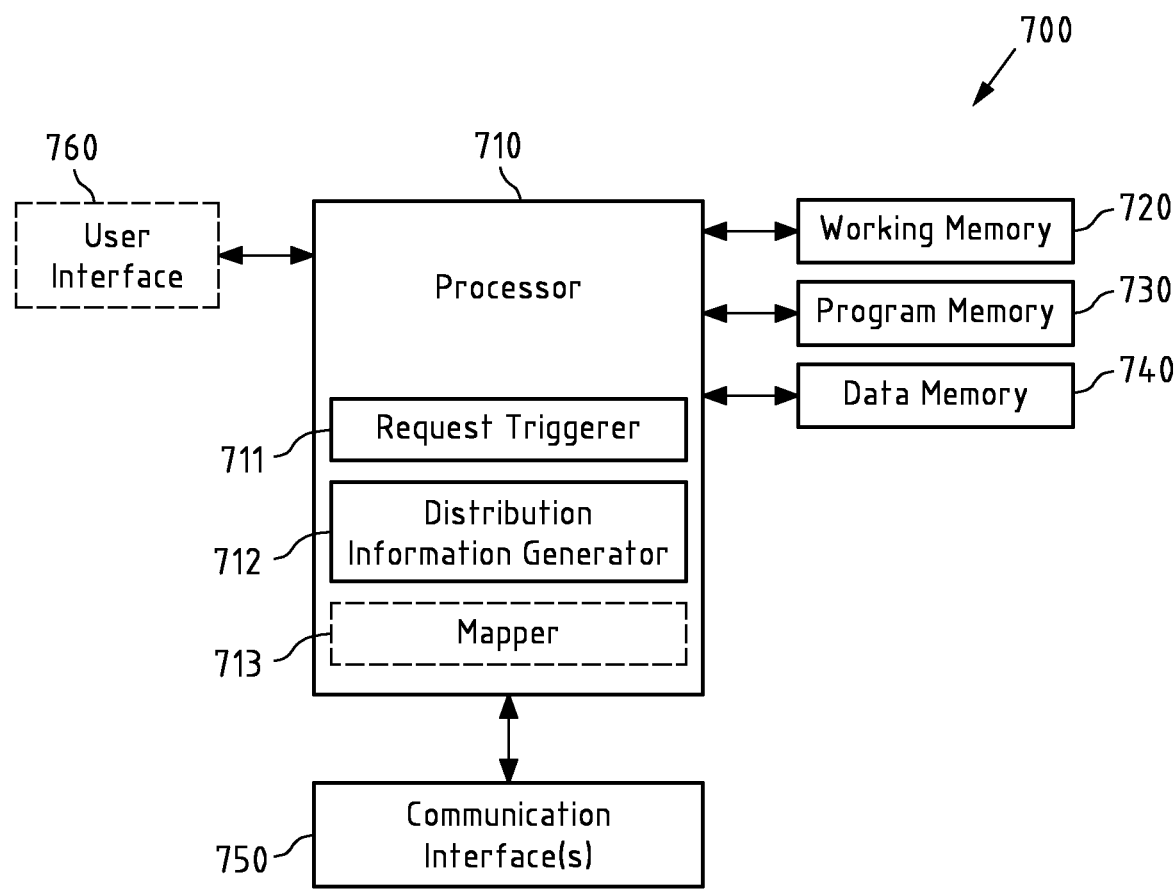
FIG. 7 a schematic block diagram of an apparatus configured to perform the method according to the first exemplary aspect.

FIG. 7 is a schematic block diagram of an apparatus 700 according to an exemplary aspect, which may for instance represent the base station 110 of FIG. 1 or 210 of FIG. 2.

Apparatus 700 comprises a processor 710, working memory 720, program memory 730, data memory 740, communication interface(s) 750, and an optional user interface 760.

Apparatus 700 may for instance be configured to perform and/or control or comprise respective means (at least one of 710 to 760) for performing and/or controlling the method according to the first exemplary aspect. Apparatus 700 may as well constitute an apparatus comprising at least one processor (710) and at least one memory (720) including computer program code, the at least one memory and the computer program code configured to, with the at least one processor, cause an apparatus, e.g. apparatus 700 at least to perform and/or control the method according to the first exemplary aspect.

Processor 710 may for instance comprise a request triggerer 711 as a functional and/or structural unit. Request triggerer 711 may for instance be configured to trigger one or more broadcast messages and/or one or more further broadcast message to be sent (see steps 502 and/or 505 of FIG. 5).

Processor 710 may for instance comprise a distribution information generator 712 as a functional and/or structural unit. Distribution information generator 712 may for instance be configured to generate distribution information related to the received measurement indications (see step 504 of FIG. 5).

Processor 710 may for instance comprise an optional mapper 713 as a functional and/or structural unit. Mapper 713 may for instance be configured to map one or more pre-configured communication resources onto at least one measurement value and/or measurement range that is expected to be measured by the plurality of device (e.g. plurality of devices 130-1 to 130-6 of FIG. 1, or 230-1 to 230-4 of FIG. 2; see step 501 of FIG. 5). This may allow that the measurement is represented by a respective measurement indication to be provided, e.g. by the apparatus 800 of FIG. 8. Mapper may be utilized to determine a configuration to be provided (e.g. sent) to plurality of devices (e.g. plurality of devices 130-1 to 130-6 of FIG. 1, or 230-1 to 230-4 of FIG. 2; see step 501 of FIG. 5).

Processor 710 may for instance further control the memories 720 to 740, the communication interface(s) 750, and the optional user interface 760.

Processor 710 may for instance execute computer program code stored in program memory 730, which may for instance represent a computer readable storage medium comprising program code that, when executed by processor 710, causes the processor 710 to perform the method according to the first exemplary aspect.

Processor 710 (and also any other processor mentioned in this specification) may be a processor of any suitable type. Processor 710 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer (s). The relevant structure/hardware has been programmed in such a way to carry out the described function. Processor 710 may for instance be an application processor that runs an operating system.

Program memory 730 may also be included into processor 710. This memory may for instance be fixedly connected to processor 710, or be at least partially removable from processor 710, for instance in the form of a memory card or stick. Program memory 730 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 730 may also comprise an operating system for processor 710. Program memory 730 may also comprise a firmware for apparatus 700.

Apparatus 700 comprises a working memory 720, for instance in the form of a volatile memory. It may for instance be a Random Access Memory (RAM) or Dynamic RAM (DRAM), to give but a few non-limiting examples. It may for instance be used by processor 710 when executing an operating system and/or computer program.

Data memory 740 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 740 may for instance store one or more configurations, one or more broadcast messages, one or more further broadcast messages, one or more measurements, one or more measurement indications, distribution information, or a combination thereof, to name but a few non-limiting examples.

Figure 4:
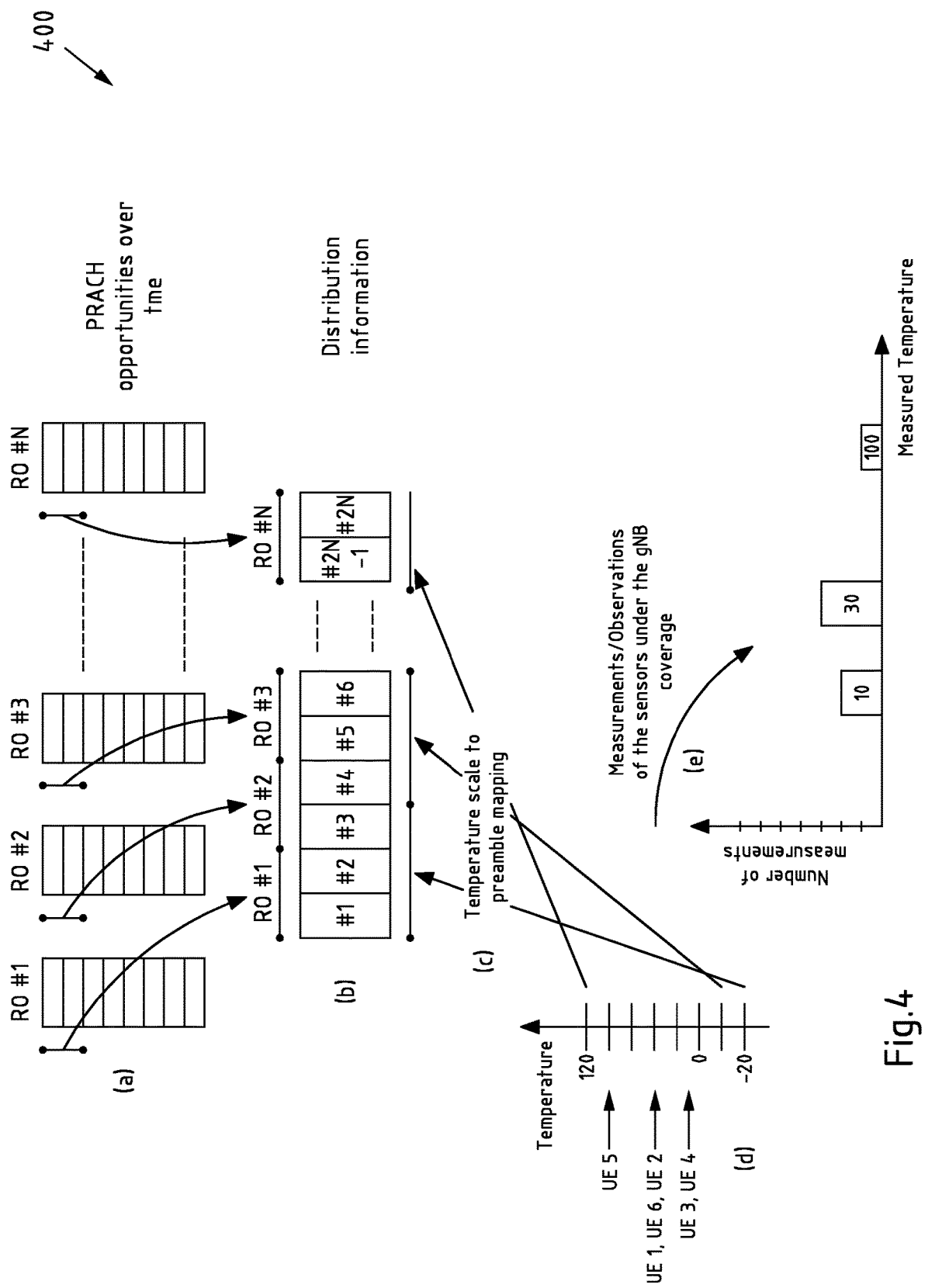
FIGS. 4a-e another implementation example according to an exemplary aspect.

Communication interface(s) 750 enable apparatus 700 to communicate with other entities, e.g. the IoT application server 120 of FIG. 1 or 220 of FIG. 2, or with one or more of the other devices 130-1 to 130-6 of FIG. 1, or 230-1 to 230-4 of FIG. 2. The communication interface(s) 750 may for instance comprise a wireless interface, e.g. a cellular radio communication interface and/or a WLAN interface) and/or wire-bound interface, e.g. an IP-based interface, for instance to communicate with entities via the Internet.

User interface 760 is optional and may comprise a display for displaying information to a user and/or an input device (e.g. a keyboard, keypad, touchpad, mouse, etc.) for receiving information from a user.

Some or all of the components of the apparatus 700 may for instance be connected via a bus. Some or all of the components of the apparatus 700 may for instance be combined into one or more modules.

Figure 8:
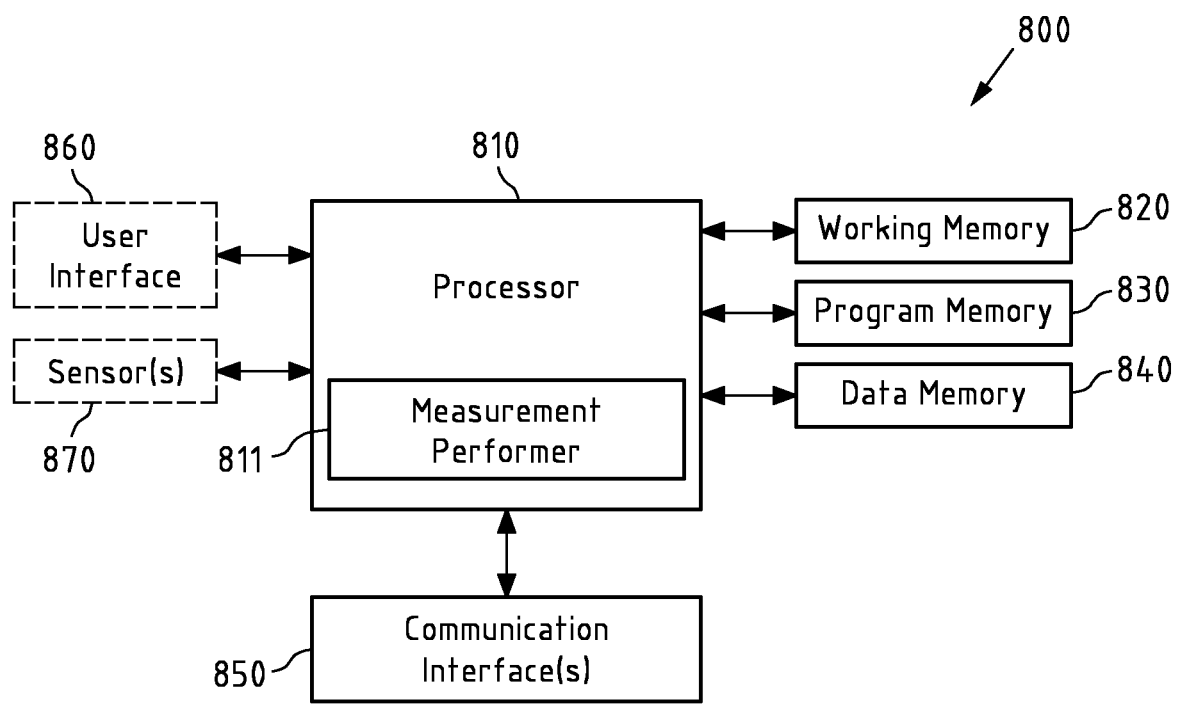
FIG. 8 a schematic block diagram of an apparatus configured to perform the method according to the second exemplary aspect.

FIG. 8 is a schematic block diagram of an apparatus 800 according to an exemplary aspect, which may for instance represent one of the devices 130-1 to 130-6 of FIG. 1, or 230-1 to 230-4 of FIG. 2.

Apparatus 800 comprises a processor 810, working memory 820, program memory 830, data memory 840, communication interface(s) 850, an optional user interface 860 and an optional sensor(s) 870.

Apparatus 800 may for instance be configured to perform and/or control or comprise respective means (at least one of 810 to 870) for performing and/or controlling the method according to the second exemplary aspect. Apparatus 800 may as well constitute an apparatus comprising at least one processor (810) and at least one memory (820) including computer program code, the at least one memory and the computer program code configured to, with the at least one processor, cause an apparatus, e.g. apparatus 800 at least to perform and/or control the method according to the second exemplary aspect.

Processor 810 may for instance comprise a measurement performer 811 as a functional and/or structural unit. Measurement performer 811 may for instance be configured to perform a measurement (e.g. by the one or more sensor(s) 870; see step 603 of FIG. 6).

Processor 810 may for instance further control the memories 820 to 840, the communication interface(s) 850, the optional user interface 860 and the optional sensor(s) 870.

Processor 810 may for instance execute computer program code stored in program memory 830, which may for instance represent a computer readable storage medium comprising program code that, when executed by processor 810, causes the processor 810 to perform the method according to the second exemplary aspect.

Processor 810 (and also any other processor mentioned in this specification) may be a processor of any suitable type. Processor 810 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 810 may for instance be an application processor that runs an operating system.

Program memory 830 may also be included into processor 810. This memory may for instance be fixedly connected to processor 810, or be at least partially removable from processor 810, for instance in the form of a memory card or stick. Program memory 830 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 830 may also comprise an operating system for processor 810. Program memory 830 may also comprise a firmware for apparatus 800.

Apparatus 800 comprises a working memory 820, for instance in the form of a volatile memory. It may for instance be a Random Access Memory (RAM) or Dynamic RAM (DRAM), to give but a few non-limiting examples. It may for instance be used by processor 810 when executing an operating system and/or computer program.

Data memory 840 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 840 may for instance store one or more configurations, one or more broadcast messages, one or more further broadcast messages, one or more measurements, one or more measurement indications, distribution information, or a combination thereof, to name but a few non-limiting examples.

Communication interface(s) 850 enable apparatus 800 to communicate with other entities, e.g. the IoT application server 120 of FIG. 1 or 220 of FIG. 2, or with one or more of the other devices 130-1 to 130-6 of FIG. 1, or 230-1 to 230-4 of FIG. 2, or with the base station 110 of FIG. 1, or 210 of FIG. 2. The communication interface(s) 850 may for instance comprise a wireless interface, e.g. a cellular radio communication interface and/or a WLAN interface) and/or wire-bound interface, e.g. an IP-based interface, for instance to communicate with entities via the Internet.

User interface 860 is optional and may comprise a display for displaying information to a user and/or an input device (e.g. a keyboard, keypad, touchpad, mouse, etc.) for receiving information from a user.

Sensor(s) 870 are optional and may for instance comprise a barometric sensor, e.g. to gather pressure information as at least one information, or a temperature sensor, e.g. to gather temperature information as at least one information, to name but a few non-limiting examples.

Some or all of the components of the apparatus 800 may for instance be connected via a bus. Some or all of the components of the apparatus 800 may for instance be combined into one or more modules.

The following embodiments shall also be considered to be disclosed:

Embodiment 1

A method comprising:
receiving measurement indications from a plurality of devices, wherein a respective measurement indication of the measurement indications is indicative of a respective measurement that has been performed by a respective device of the plurality of devices, and wherein the respective measurement indication is received via a pre-configured communication resource that is associated with a measurement value and/or measurement range to which the respective measurement corresponds.

Embodiment 2

The method according to embodiment 1, further comprising:
based on the received measurement indications, generating distribution information characterizing a distribution of the measurement values and/or measurement ranges as represented by the received measurement indications.

Embodiment 3

The method according to embodiment 1 or embodiment 2, further comprising:
requesting measurement indications from the plurality of devices via one or more broadcast messages, wherein a respective broadcast message of the one or more broadcast messages includes an appliance and/or group identifier.

Embodiment 4

The method according to any of the preceding embodiments, further comprising:
sending one or more further broadcast messages to the plurality of devices, wherein a respective further broadcast message of the one or more further broadcast messages includes an identifier of the used pre-configured communication resource and/or of the measurement value and/or measurement range; and
identifying at least one respective device of the plurality of device that has provided a respective measurement indication of the measurement indications corresponding to a particular measurement value and/or measurement range based on a response to the one or more further broadcast messages.

Embodiment 5

The method according to embodiment 3 or embodiment 4, wherein a respective broadcast message of the one or more broadcast messages and/or a respective further broadcast message of the one or more further broadcast messages is an enhanced paging message, a paging indication in a paging occasion and/or a paging early indication (e.g. including a subgrouping indication).

Embodiment 6

The method according to any of the preceding embodiments, further comprising:
providing a configuration to the plurality of devices, wherein the configuration comprises a set of pre-configured communication resources utilizable by the plurality of devices to provide a respective measurement indication, wherein the pre-configured communication resources of the set of pre-configured communication resources are associated with pre-defined measurement values and/or measurement ranges.

Embodiment 7

The method according to embodiment 6, wherein one or more measurement values and/or measurement ranges are assigned to one pre-configured communication resource of the set of pre-configured communication resources.

Embodiment 8

The method according to embodiment 6 or embodiment 7, wherein one measurement value and/or measurement range is assigned to two or more pre-configured communication resources of the set of pre-configured communication resources.

Embodiment 9

The method according to any of the embodiments 6 to 8, wherein a measurement value and/or measurement range with a higher likelihood has a larger number of pre-configured communication resources assigned than a measurement value and/or measurement range with a lower likelihood.

Embodiment 10

The method according to any of the preceding embodiments, wherein the plurality of devices are part of a group, wherein the group is associated with an identifier enabling to address respective devices of the plurality of devices that are part of the group.

Embodiment 11

The method according to any of the embodiments 6 to 10, wherein the configuration is provided to the plurality of devices within a cell coverage or to a part of the plurality of devices within the cell coverage by beamforming or by cell sectorization.

Embodiment 12

The method according to any of the preceding embodiments, wherein a respective pre-configured communication resource corresponds to a Random Access Channel, RACH, preamble, and/or a RACH opportunity.

Embodiment 13

The method according to any of the preceding embodiments, wherein a communication between the apparatus and the plurality of devices is protected.

Embodiment 14

A method, comprising:
performing a measurement; and
providing a measurement indication via a pre-configured communication resource that is associated with a measurement value and/or measurement range to which the respective measurement corresponds.

Embodiment 15

The method according to embodiment 14, further comprising:
receiving one or more broadcast messages requesting the measurement indication, wherein a respective broadcast message of the one or more broadcast messages includes an appliance and/or group identifier.

Embodiment 16

The method according to embodiment 14 or embodiment 15, further comprising:
receiving one or more further broadcast messages including an appliance and/or group identifier and an identifier of the used pre-configured communication resource and/or a measurement value and/or measurement range requesting identification of the apparatus in case the apparatus is associated with the appliance and/or group identifier and has provided a measurement indication being associated with the said measurement value and/or measurement range and/or via the pre-configured communication resource as represented by the identifier.

Embodiment 17

The method according to embodiment 15 or embodiment 16, wherein a respective broadcast message of the one or more broadcast messages and/or a respective further broadcast message of the one or more further broadcast messages is an enhanced paging message, a paging indication in a paging occasion and/or a paging early indication (e.g. including a subgrouping indication).

Embodiment 18

The method according to any of the embodiments 14 to 17, further comprising:
receiving a configuration, wherein the configuration comprises a set of pre-configured communication resources utilizable by the apparatus to provide the respective measurement indication, wherein the pre-configured communication resources of the set of pre-configured communication resources are associated with pre-defined measurement values and/or measurement ranges.

Embodiment 19

The method according to any of the embodiment 18, wherein one or more measurement values and/or measurement ranges are assigned to one pre-configured communication resource of the set of pre-configured communication resources.

Embodiment 20

The method according to embodiment 18 or embodiment 19, wherein measurement value and/or measurement range is assigned to two or more pre-configured communication resources of the set of pre-configured communication resources.

Embodiment 21

The method according to any of the embodiments 18 to 20, wherein a measurement value and/or measurement range with a higher likelihood has a larger number of pre-configured communication resources assigned than a measurement value and/or measurement range with a lower likelihood (e.g. compared to the ones with the higher likelihood).

Embodiment 22

The method according to any of the embodiments 14 to 20, wherein a respective pre-configured communication resource corresponds to a Random Access Channel, RACH, preamble and/or a RACH opportunity (e.g. and/or a cyclic shift used to transmit a RACH preamble).

Embodiment 23

An apparatus configured to perform and/or control or comprising respective means for performing and/or controlling the method of any of the embodiments 1 to 13.

Embodiment 24

An apparatus comprising at least one processor and at least one memory including computer program code, the at least one memory and the computer program code configured to, with the at least one processor, cause an apparatus at least to perform and/or control the method of any of the embodiments 1 to 13.

Embodiment 25

An apparatus configured to perform and/or control or comprising respective means for performing and/or controlling the method of any of the embodiments 14 to 22.

Embodiment 26

An apparatus comprising at least one processor and at least one memory including computer program code, the at least one memory and the computer program code configured to, with the at least one processor, cause an apparatus at least to perform and/or control the method of any of the embodiments 14 to 22.

Embodiment 27

A tangible computer-readable medium storing computer program code, the computer program code when executed by a processor causing an apparatus to perform and/or control the method of any of the embodiments 1 to 13.

Embodiment 28

A tangible computer-readable medium storing computer program code, the computer program code when executed by a processor causing an apparatus to perform and/or control the method of any of the embodiments 14 to 22.

Embodiment 29

A system comprising:
- at least one apparatus according to embodiment 23 or 24; and
- a plurality (e.g. at least two) of apparatuses according to embodiment 25 or 26.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The subject-matter has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least:
    provide a configuration to a plurality of devices, wherein the configuration comprises a set of pre-configured communication resources utilizable by the plurality of devices to provide a respective measurement indication, wherein the pre-configured communication resources of the set of pre-configured communication resources are associated with pre-defined measurement values and/or measurement ranges;
    request measurement indications from the plurality of devices via one or more broadcast messages, wherein a respective broadcast message of the one or more broadcast messages includes an appliance and/or group identifier, and wherein the one or more broadcast messages are sent to the plurality of devices being a part of a group, and wherein a respective broadcast message of the one or more broadcast messages is an enhanced paging message, a paging indication in a paging occasion and/or a paging early indication;
    receive the measurement indications from the plurality of devices, wherein a respective measurement indication of the measurement indications is indicative of a respective measurement that has been performed by a respective device of the plurality of devices, and wherein the respective measurement indication is received via a pre-configured communication resource that is associated with a measurement value and/or measurement range to which the respective measurement corresponds, wherein the configuration is provided by at least one of broadcast, groupcast, or unicast, or via dedicated signaling;
    based on the received measurement indications, generate distribution information characterizing a distribution of the measurement values and/or measurement ranges as represented by the received measurement indications, wherein the distribution information is based on the received measurement indications;
    forward to an IoT application server, at least one of the received measurement indications or distribution information derived from the received measurement indications;

transmit one or more further broadcast messages to the plurality of devices, wherein a respective further broadcast message of the one or more further broadcast messages includes an identifier of the used pre-configured communication resource and/or of the measurement value and/or measurement range; and identify at least one respective device of the plurality of devices that has provided a respective measurement indication of the measurement indications corresponding to a particular measurement value and/or measurement range based on a response to the one or more further broadcast messages, wherein one or more measurement values and/or measurement ranges are assigned to one pre-configured communication resource of the set of pre-configured communication resources, wherein one measurement value and/or measurement range is assigned to two or more pre-configured communication resources of the set of pre-configured communication resources, wherein a measurement value and/or measurement range with a higher likelihood has a larger number of pre-configured communication resources assigned than a measurement value and/or measurement range with a lower likelihood, wherein a respective pre-configured communication resource corresponds to a random access channel (RACH) preamble and/or a RACH opportunity.

* * * * *